United States Patent
Kim et al.

(10) Patent No.: US 8,392,854 B2
(45) Date of Patent: Mar. 5, 2013

(54) METHOD OF MANUFACTURING SEMICONDUCTOR DEVICE BY USING UNIFORM OPTICAL PROXIMITY CORRECTION

(75) Inventors: Sang-wook Kim, Yongin-si (KR); Chun-suk Suh, Yongin-si (KR); Seong-woon Choi, Suwon-si (KR); Jung-hoon Ser, Seoul (KR); Moon-gyu Jeong, Seoul (KR); Seong-bo Shim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/084,143

(22) Filed: Apr. 11, 2011

(65) Prior Publication Data
US 2011/0265048 A1    Oct. 27, 2011

(30) Foreign Application Priority Data
Apr. 21, 2010  (KR) .................. 10-2010-0036841

(51) Int. Cl.
*G06F 17/50*    (2006.01)
(52) U.S. Cl. ........................... 716/53; 716/55
(58) Field of Classification Search .............. 716/53, 716/55
See application file for complete search history.

(56) References Cited

U.S. PATENT DOCUMENTS

| | | | | |
|---|---|---|---|---|
| 2003/0203287 A1* | 10/2003 | Miyagawa | ............ | 430/5 |
| 2004/0003366 A1* | 1/2004 | Suzuki | ............ | 716/11 |
| 2008/0178140 A1* | 7/2008 | Lin et al. | ............ | 716/19 |

FOREIGN PATENT DOCUMENTS

| | | |
|---|---|---|
| JP | 2006-235184 | 9/2006 |
| KR | 10-0896856 B1 | 4/2009 |
| KR | 10-896861 B1 | 4/2009 |

\* cited by examiner

*Primary Examiner* — Vuthe Siek
*Assistant Examiner* — Mohammed Alam
(74) *Attorney, Agent, or Firm* — Lee & Morse, P.C.

(57) ABSTRACT

A method of manufacturing a semiconductor device includes dividing a design pattern layout into a repetitive pattern part and a non-repetitive pattern part, obtaining an optical proximity correction (OPC) bias from an extracted portion, the extracted portion being a partial portion of the repetitive pattern part, applying the OPC bias obtained from the extracted portion equally to the extracted portion and other portions of the repetitive pattern part so as to form a first corrected layout in which corrected layouts of the other portions are the same as that of the extracted portion, and forming a photomask in all portions of the repetitive pattern part according to the first corrected layout.

20 Claims, 23 Drawing Sheets

METHOD OF MANUFACTURING SEMICONDUCTOR DEVICE BY USING UNIFORM OPTICAL PROXIMITY CORRECTION

BACKGROUND

1. Field

Embodiments relate to a method of manufacturing a semiconductor device by using optical proximity correction (OPC).

2. Description of the Related Art

At the time of designing an integrated circuit (IC), in order to form a desired circuit on a semiconductor substrate, a layout of the circuit is fabricated, and then the layout may be transferred on a surface of a wafer via a photomask in a photolithography process. Since a design of an IC becomes more complicated with increasing integration of a semiconductor device, it is very important to exactly implement a pattern layout on a photomask according to an initial design.

Where the wavelength of the illumination source used in the exposing equipment approaches a feature size, a pattern may be distorted due to diffraction of the light, interference of the light, or the like. Accordingly, an optical proximity effect may occur, such that a shape different from an original shape may be formed on a wafer, or a pattern shape may be distorted due to an effect of an adjacent pattern. In order to prevent problems, e.g., dimensional changes, due to the optical proximity effect, an OPC operation is performed so that a design pattern is changed, in advance of the photomask formation, by predicting the dimensional change during a transfer of a pattern during photolithography, such that a pattern shape according to a desired layout may be obtained after the transfer of the pattern.

SUMMARY

An embodiment is directed to a method of manufacturing a semiconductor device, the method including dividing a design pattern layout into a repetitive pattern part and a non-repetitive pattern part, obtaining an optical proximity correction (OPC) bias from an extracted portion, the extracted portion being a partial portion of the repetitive pattern part, applying the OPC bias obtained from the extracted portion equally to the extracted portion and other portions of the repetitive pattern part so as to form a first corrected layout in which corrected layouts of the other portions are the same as that of the extracted portion, and forming a photomask in all portions of the repetitive pattern part according to the first corrected layout.

The method may further include performing an OPC operation on all portions of the non-repetitive pattern part in the design pattern layout to form a second corrected layout, and forming a merged corrected layout by merging the first and second corrected layouts. The photomask may be formed according to the merged corrected layout.

Forming the first corrected layout and forming the second corrected layout may be performed in parallel.

Forming the second corrected layout may be performed after forming the first corrected layout.

Forming the second corrected layout may include performing an OPC operation on the non-repetitive pattern part by referring to the first corrected layout of the repetitive pattern part.

The method may further include dividing the design pattern layout into a plurality of templates by reading a design hierarchy of the design pattern layout. Dividing the design pattern layout into the repetitive pattern part and the non-repetitive pattern part may include dividing a design pattern layout that is included in each of the plurality of templates into the repetitive pattern part and the non-repetitive pattern part.

Forming the first corrected layout of the repetitive pattern part may include obtaining an OPC bias from an extracted portion that is selected from a repetitive pattern part of each of the plurality of templates, and, without obtaining an OPC bias of the portions of the repetitive pattern part other than the extracted portion, applying the OPC bias of the extracted portion to the portions of the repetitive pattern part of each of the plurality of templates.

The method may further include forming a second corrected layout by performing an OPC operation on all portions of a non-repetitive pattern in the design pattern layout included in each of the plurality of templates, and forming a merged corrected layout by merging the first corrected layout and the second corrected layout, with respect to the plurality of templates.

Obtaining the OPC bias from the extracted portion and forming the first corrected layout of the extracted portion may include dividing an edge line of a design pattern layout of an OPC operation target into a plurality of segments, and forming a perturbation pattern by applying perturbation on first segments of the plurality of segments so as to move the first segments in a desired direction, the first segments being segments of the extracted portion. While the perturbation is applied to the first segments of the extracted portion, the same perturbation that is applied to the first segments may be applied to second segments in other portions of the repetitive pattern part, the second segments having a shape that is the same as or symmetrical to that of the first segments.

Dividing the design pattern layout into the repetitive pattern part and the non-repetitive pattern part may include assigning, as the repetitive pattern part, a part in which patterns having the same shape are repetitively disposed, and a part in which patterns that are symmetrical to each other are repetitively disposed.

Data of a corrected layout may be used in order to apply the first corrected layout to a first portion having the same design pattern layout as the extracted portion of the repetitive pattern part, the corrected layout having the same shape as the first corrected layout.

Data of a corrected layout may be used in order to apply the first corrected layout to a second portion having a symmetrical design pattern layout to the extracted portion of the repetitive pattern part, the corrected layout being symmetrically converted from data regarding the first corrected layout.

When the second portion has a design pattern layout that has a point-symmetrical shape to the extracted portion, data of a corrected layout that is point-symmetrically converted from the data regarding the first corrected layout may be used to apply the first corrected layout to the second portion, and, when the second portion has a design pattern layout that has a line-symmetrical shape to the extracted portion, data of a corrected layout that is line-symmetrically converted from the data regarding the first corrected layout may be used to apply the first corrected layout to the second portion.

Another embodiment is directed to a method of manufacturing a semiconductor device, the method including providing a design pattern layout, dividing the design pattern layout into a plurality of templates by using a design hierarchy of the design pattern layout, dividing a design pattern layout included in each of the plurality of templates into a repetitive pattern part and a non-repetitive pattern part, performing an optical proximity correction (OPC) operation on an extracted portion that is a partial portion of the repetitive pattern part in each of the plurality of templates to form a first corrected layout of the extracted portion, applying the first corrected layout of the extracted portion to other portions of the repetitive pattern part except for the extracted portion in each of the plurality of templates, without obtaining an OPC bias, performing an OPC operation on all portions of the non-repetitive pattern part in each of the plurality of templates to form a second corrected layout, and forming a merged corrected layout by merging the first corrected layout and the second corrected layout that are formed in the plurality of templates.

Forming the first corrected layout and forming the second corrected layout may be performed in parallel in each of the plurality of templates.

Forming the second corrected layout may be performed in each of the plurality of templates after sequentially forming the first corrected layout by obtaining the OPC bias from the extracted portion, and applying the first corrected layout to the other portions of the repetitive pattern part except for the extracted portion.

When the second corrected layout is formed in a template that is selected from the plurality of templates, an OPC operation may be performed on a non-repetitive pattern part in the selected template by referring to the first corrected layout of a repetitive pattern part in the selected template.

Dividing the design pattern layout included in each of the plurality of templates into the repetitive pattern part and the non-repetitive pattern part may include determining the repetitive pattern part and the non-repetitive pattern part by determining pattern uniformity according to shapes of a plurality of polygons configuring a design pattern layout included in each of the plurality of templates.

Dividing the design pattern layout included in each of the plurality of templates into the repetitive pattern part and the non-repetitive pattern part may include determining the repetitive pattern part and the non-repetitive pattern part by determining pattern uniformity according to a feature of edges that configure an outline of a design pattern layout included in each of the plurality of templates.

Another embodiment is directed to a method of forming a photomask, the method including providing a design pattern layout, the design pattern layout having a first pattern that appears at least two times in the design pattern layout such that the design pattern layout includes at least a first instance and a second instance of the first pattern, determining a first optical proximity correction bias based on the first instance of the first pattern, the first optical proximity correction not being based on the second instance of the first pattern, providing a modified design pattern layout by applying the first optical proximity correction bias to each of the first instance and the second instance of the first pattern, and forming a photomask using the modified design pattern layout.

BRIEF DESCRIPTION OF THE DRAWINGS

The above and other features and advantages will become more apparent to those of skill in the art by describing in detail example embodiments with reference to the attached drawings, in which:

FIGS. 2A through 2C illustrate examples of design pattern layouts, wherein FIG. 2A is an example of a design pattern layout used to form a plurality of line patterns, FIG. 2B is an example of a design pattern layout used to form a plurality of island patterns, and FIG. 2C is an example of the design pattern layout used to form a plurality of patterns having various shapes;

DETAILED DESCRIPTION

Figure 1A:
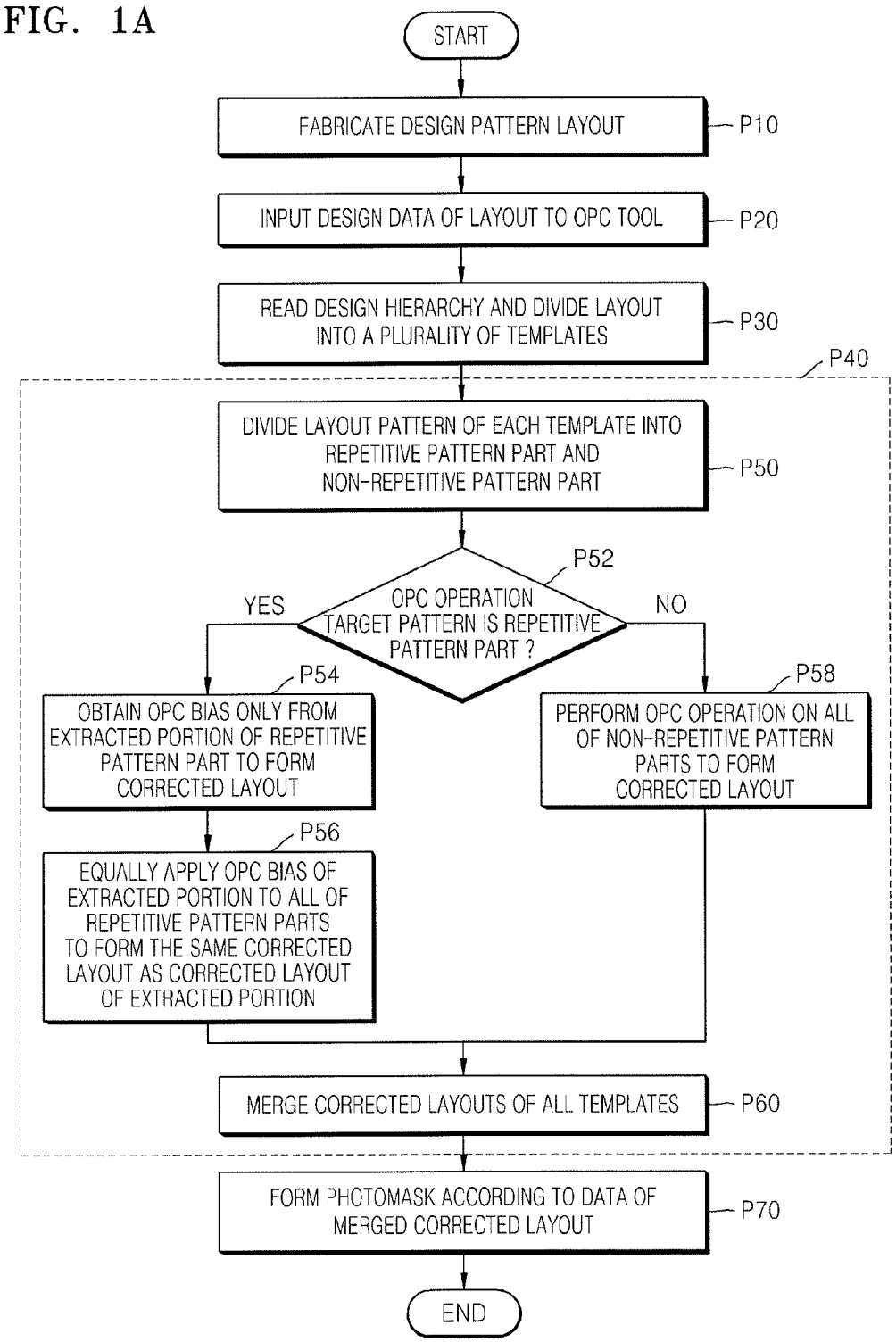
FIG. 1A illustrates a flowchart of a method of manufacturing a semiconductor device, according to an embodiment.

Korean Patent Application No. 10-2010-0036841, filed on Apr. 21, 2010, in the Korean Intellectual Property Office, and entitled: "Method of Manufacturing Semiconductor Device by Using Uniform Optical Proximity Correction," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

All examples and conditional language recited herein are to be construed as being without limitation to the specifically recited examples and conditions. Throughout the specification, a singular form may include plural forms, unless there is a particular description contrary thereto.

While terms "first" and "second" are used to describe various components, parts, regions, layers and/or portions, it will be apparent that the components, parts, regions, layers, and/or portions are not limited to the terms "first" and "second." The terms "first" and "second" are used only to distinguish between each of such components, each of such parts, each of such regions, each of such layers, and/or each of such portions. Thus, throughout the specification, a first component, a first part, a first region, a first layer, or a first portion may indicate a second component, a second part, a second region, a second layer, or a second portion.

In addition, relative terms such as "lower" or "bottom," and "upper" or "top" may be used to describe relationship between elements as illustrated in the drawings. These relative terms will be understood to include different directions, in addition to the described directions illustrated in the drawings. For example, when elements are turned over in the drawings, elements described to be on lower surfaces of other elements are formed on upper surfaces of the other elements. Therefore, the term "lower" depends only on a predetermined direction and can include both "upper" and "lower" directions. Similarly, when a device is turned over in one of the drawings, elements which are described to be "below or beneath" some other elements are then "above" of the other elements. Accordingly, the term "below" can include both directions "above and below."

Unless expressly described otherwise, all terms including descriptive or technical terms which are used herein should be construed as having meanings that are apparent to one of skill in the art.

Also, terms that are defined in a general dictionary and that are used in the following description should be construed as having meanings that are equivalent to meanings used in the related description, and unless expressly described otherwise herein, the terms should not be construed as being ideal or excessively formal.

FIG. 1A illustrates a flowchart of a method of manufacturing a semiconductor device, according to an embodiment.

Referring to FIG. 1A, a design pattern layout for the semiconductor device to be manufactured is provided (operation P10).

For example, a full-chip layout of a semiconductor memory device (e.g., a dynamic random access memory (DRAM), a flash memory, or the like) has various pattern densities and pattern shapes according to regions. A cell array region of the semiconductor memory device includes a plurality of unit cells having the same structure, and thus may include regions in which a plurality of patterns having the same shapes and/or symmetrical shapes are repetitively formed at high density. Also, a peripheral circuit region and a core region, which may be formed around the cell array region, may include a plurality of patterns that are the same or symmetrical to each other.

Figure 2A:
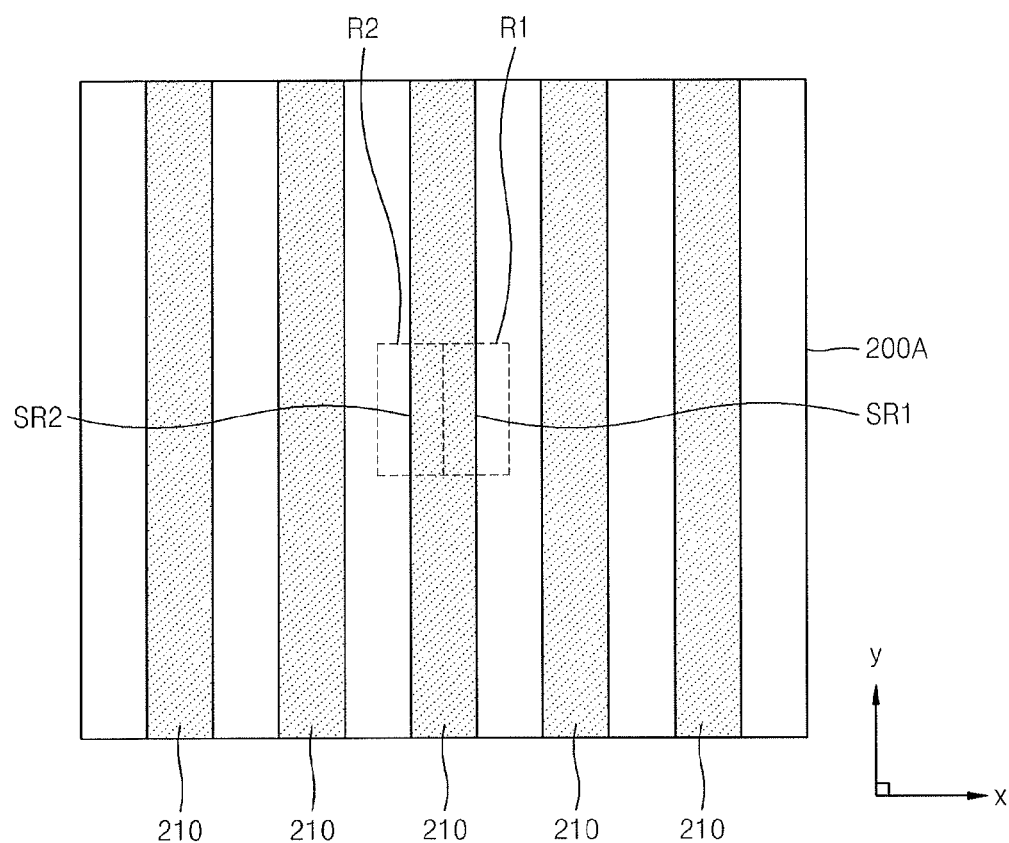
Figure 2B:
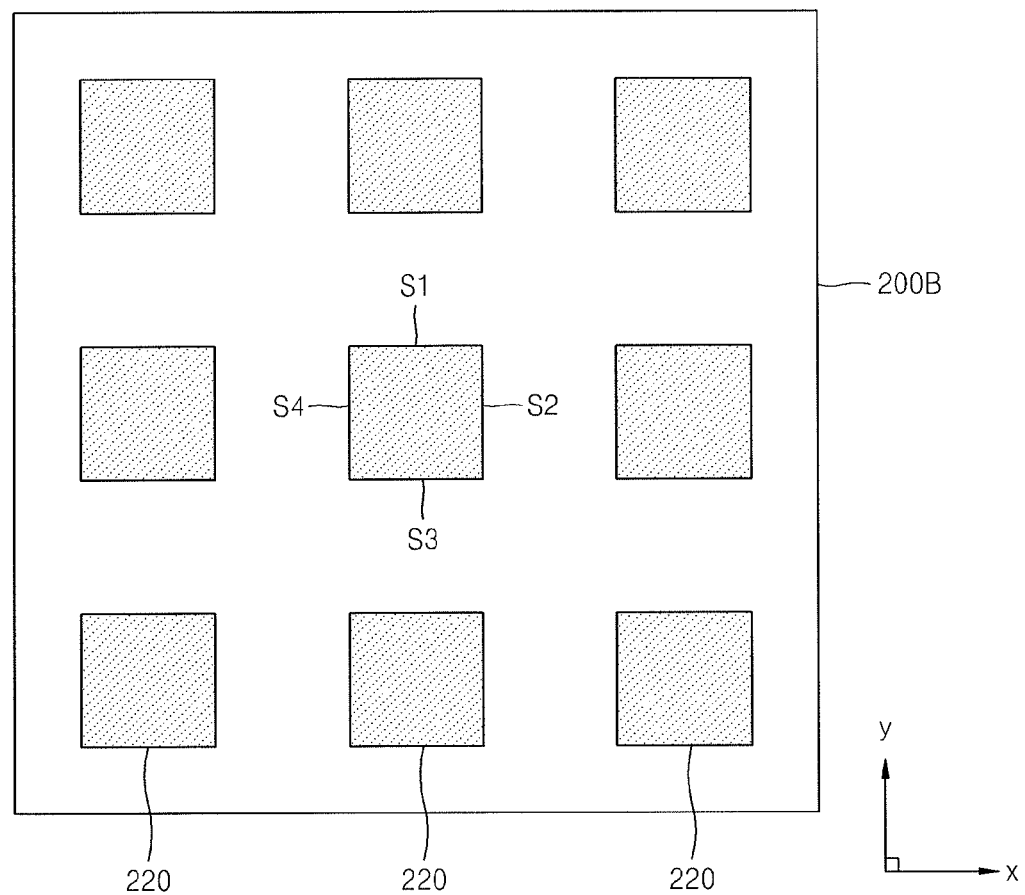
Figure 2C:
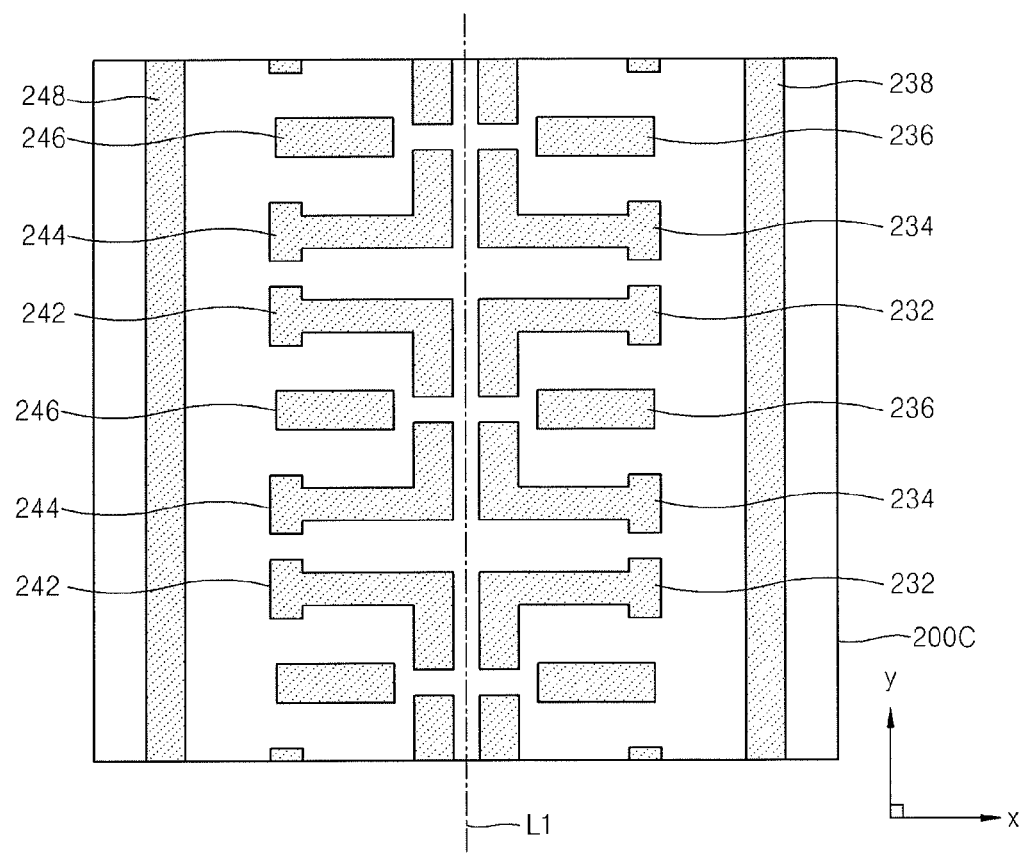

FIGS. 2A through 2C illustrate examples of design pattern layouts to which the method of manufacturing a semiconductor device according to the present embodiment may be applied. Hereinafter, the design pattern layouts will be described in detail.

FIG. 2A illustrates an example of the design pattern layout used to form a plurality of line patterns 210, such as may be required to implement a semiconductor device. For example, the plurality of line patterns 210 may be used to form a plurality of active regions or a plurality of wiring lines in a cell array region of a semiconductor memory device.

FIG. 2A illustrates a layout of a first part 200A that is configured with a plurality of line patterns 210. The line patterns 210 have the same shapes and same sizes, respectively, and are repetitively disposed in parallel. In FIG. 2A, each of the plurality of line patterns 210 has a shape that is left and right symmetrical about its long axis (a central axis in a Y-direction of FIG. 2A).

FIG. 2B illustrates the example of the design pattern layout used to form a plurality of island patterns 220, such as may be required to implement a semiconductor device. The plurality of island patterns 220 may be used to form a plurality of contact holes, a plurality of contact pads, or a plurality of conductive regions in a cell array region of a semiconductor memory device.

FIG. 2B illustrates a layout of a second part 200B that is configured with a plurality of island patterns 220. The island patterns 220 have the same shapes and same sizes, respectively, and are repetitively disposed in parallel. Each of the plurality of island patterns 220 has a shape that is left and right symmetrical about its X-direction central axis or its Y-direction central axis.

FIG. 2C illustrates the example of the design pattern layout used to form a plurality of patterns having various shapes, such as may be required to implement a semiconductor device.

In particular, FIG. 2C illustrates a layout of a third part 200C. The third part 200C is configured with a plurality of first patterns 232, a plurality of second patterns 234, a plurality of third patterns 236, and a plurality of fourth patterns 238, which have the same shapes and same sizes and are repetitively disposed. The third part 200C is also configured with a plurality of fifth patterns 242, a plurality of sixth patterns 244, a plurality of seventh patterns 246, and a plurality of eighth patterns 248, which are line-symmetrical to the first patterns 232, the second patterns 234, the third patterns 236, and the fourth patterns 238, respectively. Also, in the third part 200C, each first pattern 232 and each second pattern 234 are line-symmetrical to each other, and each fifth pattern 242 and each sixth pattern 244 are line-symmetrical to each other FIG. 1C illustrates a block diagram of a configuration of an optical proximity correction (OPC) tool 100 that may be used to perform a method of manufacturing a semiconductor device according to one or more embodiments.

Referring back to FIG. 1A, design data of the design pattern layout that is fabricated in operation P10 is input to the OPC tool 100 (operation P20 of FIG. 1A). The design data of the design pattern layout, which is input to the OPC tool 100, may be stored in a data storage device 102, e.g., a disc array of the OPC tool 100 or a server. The OPC tool 100 may read a design hierarchy from the design data in the data storage device 102, analyze the design hierarchy, and thus, divide a layout of a full-chip layer into a plurality of templates T1, T2, T3, . . . , Tn (where n is a natural number) according to types of a unit device, and a proximity environment (operation P30). The analysis of the design hierarchy is performed on the entire layout of the full-chip layer.

The layout of the full-chip layer may include the first part 200A, the second part 200B, and the third part 200C that are illustrated in FIGS. 2A through 2C, respectively. For example, the layout may include a plurality of cells for defining particular unit device sets, which may include an isolation region, a gate electrode, a wiring line, a contact region, or the like. A layout in each of the cells may be indicated as a plurality of polygons for defining boundaries of a corresponding layout. A cell selected from the cells may be nested in another cell in a complicated arrangement. Such structures of the cells configure the design hierarchy.

In the analysis of the design hierarchy, the cells may be divided into the plurality of templates T1, T2, T3, . . . , TN according to types of the polygons, and a proximity environment in an exposing process. For example, some of the cells, which have the same polygon and the same proximity environment, may configure one template. Here, each of the templates T1, T2, T3, . . . , TN may be used as a basic unit in an OPC operation.

Templates from the templates T1, T2, T3, . . . , TN that include the same layout design data may be regarded as a same template, whereas templates having different layout design data may be classified into different types of templates. Here, a division among the templates T1, T2, T3, ..., TN may refer to geometrical information of a layout included in each of the templates. For example, the geometrical information may include two-dimensional data (such as lengths and directions of edges that configure an outline of a polygon and a pattern, a direction and size of the pattern, a ratio of a pattern portion to a space portion, a shape of the pattern, and the like). Each of the templates may be formed as a quadrangular region having a size determined according to settings set by a user.

Referring to again to the OPC tool 100 in FIG. 1C, the templates T1, T2, T3, ..., TN may be provided to a plurality of nodes 112_1, 112_2, 112_3, ..., 112_N from a cluster controller 104 via a bus 106. The nodes 112_1, 112_2, 112_3, ..., 112_N are included in a calculation system 110. Thus, the OPC operation may be simultaneously performed on the templates T1, T2, T3, ..., TN, and thus it may be possible to reduce a total turnaround time (TAT) of the OPC operation.

After the layout of the full-chip layer is divided into the templates T1, T2, T3, ..., TN in operation P30 of FIG. 1A, a subsequent procedure is performed using a process for selectively performing the OPC operation on a layout pattern in each of the templates T1, T2, T3, ..., TN (operation P40 of FIG. 1A).

In the process for selectively performing the OPC operation (operation P40 of FIG. 1A) according to the present embodiment, all layout patterns in the templates T1, T2, T3, ..., TN are divided into a repetitive pattern part (in which the same shapes or symmetrical shapes are repetitively disposed), and a non-repetitive pattern part that does not have a repetitive pattern (operation P50 of FIG. 1A) (the repetitive pattern part may be referred to herein as 'RP' and the non-repetitive pattern part may be referred to herein as 'NRP'; see, e.g., FIGS. 8A-E).

Here, if a layout pattern of the templates T1, T2, T3, ..., TN includes a symmetrical pattern part (relative to a predetermined point or a predetermined line), the symmetrical pattern part may be regarded as the repetitive pattern part RP. By using data that is obtained by point-symmetrically or line-symmetrically moving location data regarding the symmetrical pattern part, the symmetrical pattern part may be processed in the same manner as the repetitive pattern part RP.

In order to determine the repetitive pattern part RP in operation P50 of FIG. 1A, pattern uniformity may be determined according to shapes of polygons configuring the layout patterns of the templates T1, T2, T3, ..., TN, or according to features including lengths or directions of edges configuring an outline of each layout pattern.

In a case where the pattern division is performed according to an edge line of a pattern, portions having the same repetitive pattern part RP may be indicated with the same color.

For example, in FIG. 2A, a rectangle indicated as "R1" has a line-symmetrical shape with respect to a rectangle indicated as "R2", and thus regions including an "R1" portion and an "R2" portion may be determined to be repetitive pattern parts RP. Therefore, only one of the "R1" portion and "R2" portion may be determined to be a basic repetition part. Also, in a case where the pattern division is performed according to edges of the line patterns 210, a line SR1 in the "R1" portion and a line SR2 in the "R2" portion may have the same color, and only one of the line SR1 and line SR2 may be determined to be a basic repetition part.

In another example, in FIG. 2B, lines S1, S2, S3, and S4 are point-symmetrical or line-symmetrical to each other, and thus the lines S1, S2, S3, and S4 may be determined to be repetitive pattern parts RP. Therefore, only one of the lines S1, S2, S3, and S4 may be determined to be a basic repetition part. In a case where the pattern division is performed according to edges of the island patterns 220, the lines S1, S2, S3, and S4 may have the same color, and only one of the lines S1, S2, S3, and S4 may be determined to be a basic repetition part.

In another example, in FIG. 2C, with respect to the plurality of first patterns 232, the plurality of second patterns 234, the plurality of third patterns 236, the plurality of fourth patterns 238, the plurality of fifth patterns 242, the plurality of sixth patterns 244, the plurality of seventh patterns 246, and the plurality of eighth patterns 248, lines configuring each pattern may be regarded as basic units and then a basic repetition part may be determined by referring to the lines.

Referring again to FIG. 1A, on a case where an OPC target pattern is determined to be a repetitive pattern part RP in a corresponding template in operation P52 of FIG. 1A, an OPC bias is obtained from an extracted portion. The extracted portion is a partial portion selected from the repetitive pattern part RP (see, e.g., extracted portion 310 in FIG. 3A, extracted portion 310E in FIG. 3B, extracted portion 320 in FIG. 3C, etc.).

The extracted portion may be set as a minimum repetition unit selected from the repetitive pattern part RP. In another implementation, the extracted portion may be set as a range that is further extended than the minimum repetition unit.

After the OPC bias is obtained from an extracted portion, a corrected layout of the extracted portion is formed (operation P54 of FIG. 1A). When a layout pattern that is included in the extracted portion is divided into a plurality of segments, and perturbation is performed on each of the segments so as to obtain the OPC bias in operation P54, perturbation on the segment in the extracted portion and perturbation on a pattern portion may be simultaneously performed (the pattern portion is the same as the segment in the extracted portion, and is from among portions that are not extracted in the repetitive pattern part RP). Thus, the portions that are not extracted in the repetitive pattern part RP are perturbed according to the perturbation performed on the extracted portion. The effect thereof is as follows.

As will now be described, the times of the simulation processes, and a time taken to reach the final OPC bias may be significantly decreased with respect to the extracted portion. For example, in a case where a value of the OPC bias obtained from the extracted portion is not an exact value, it may be necessary to repeat a simulation process so as to obtain an exact value. Where the simulation process has to be performed a number of times, the simulation process with respect to obtaining the OPC bias from the extracted portion is performed again, while the OPC bias that has been obtained from the extracted portion in the previous simulation process is already reflected on other portions of the repetitive pattern part RP. By doing so, the times of the simulation processes and a time taken to reach the final OPC bias are significantly decreased in the extracted portion. Thus, it is possible to reduce a time taken in the simulation process that is necessary to obtain the final OPC bias from the extracted portion.

Further to the above, after the OPC bias is obtained from the extracted portion in operation P54, the OPC bias obtained from the extracted portion is equally applied to other portions of the repetitive pattern part RP for which OPC bias has not been obtained yet. Thus, a corrected layout having the same shape as the corrected layout of the extracted portion is formed (operation P56 of FIG. 1A).

In a case where the OPC target pattern is determined to be a non-repetitive pattern part NRP (instead of the repetitive pattern part RP) in the corresponding template in operation P52 of FIG. 1A, the OPC operation is performed on all portions of the non-repetitive pattern part NRP so that a corrected layout is formed (operation P58 of FIG. 1A).

With respect to the non-repetitive pattern part NRP, an OPC bias is obtained for each portion. For this, the OPC operation may be performed on all portions of the non-repetitive pattern part NRP.

As an example, edge lines of each pattern in an OPC operation target region are first divided into a plurality of segments. Afterward, by performing a simulation process, a necessary OPC bias is searched for by performing the OPC operation on each segment. Here, a perturbation pattern may be formed by moving each segment in a desired direction to apply perturbation to each segment. When the OPC bias is obtained with respect to each segment by performing the simulation process, the obtained OPC bias is applied to each segment. The simulation process and the OPC bias applying process are repeated until an image contour of each segment is fitted to a target on the design pattern layout. Here, the simulation process may be performed within a tolerance range of a semiconductor device manufacturing procedure.

Operations P54, P56, and P58 of FIG. 1A may be simultaneously performed, i.e., performed in parallel.

Referring again to FIG. 1A, after corrected layouts are formed for all of the templates T1, T2, T3, . . . , TN according to the process for selectively performing the OPC operation (operation P40 of FIG. 1A), the corrected layouts obtained from the templates T1, T2, T3, . . . , TN of the full-chip layer are merged so that a merged corrected layout is formed (operation P60 of FIG. 1A).

Based on data of the merged corrected layout, a photomask to be used in an exposing process for the manufacture of a semiconductor device is formed so that a photolithography process may be performed to form a desired semiconductor device (operation P70 of FIG. 1A).

Figure 1B:
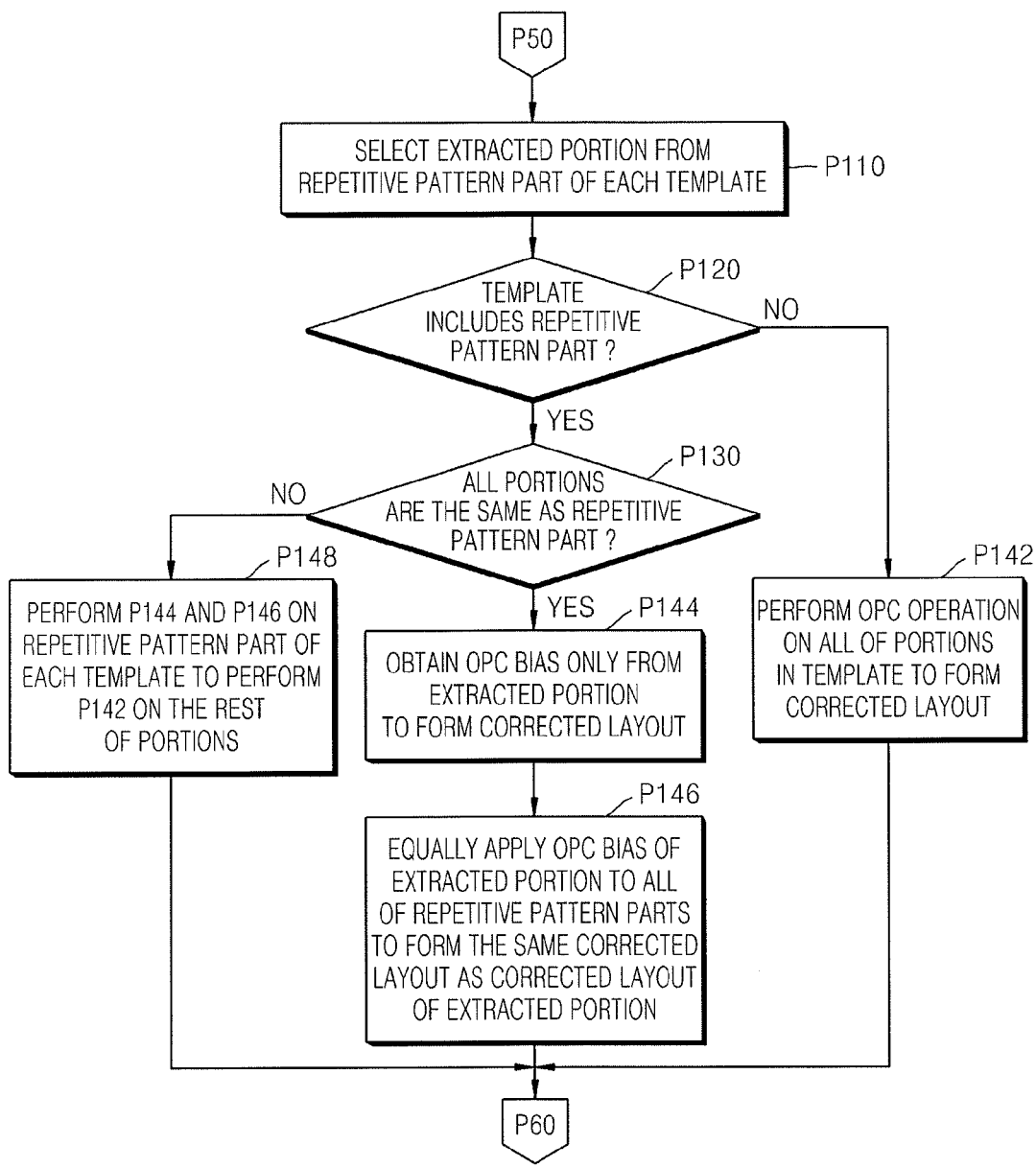
FIG. 1B illustrates a flowchart of details of a process for selectively performing an optical proximity correction (OPC) operation according to an embodiment.
Figure 1C:
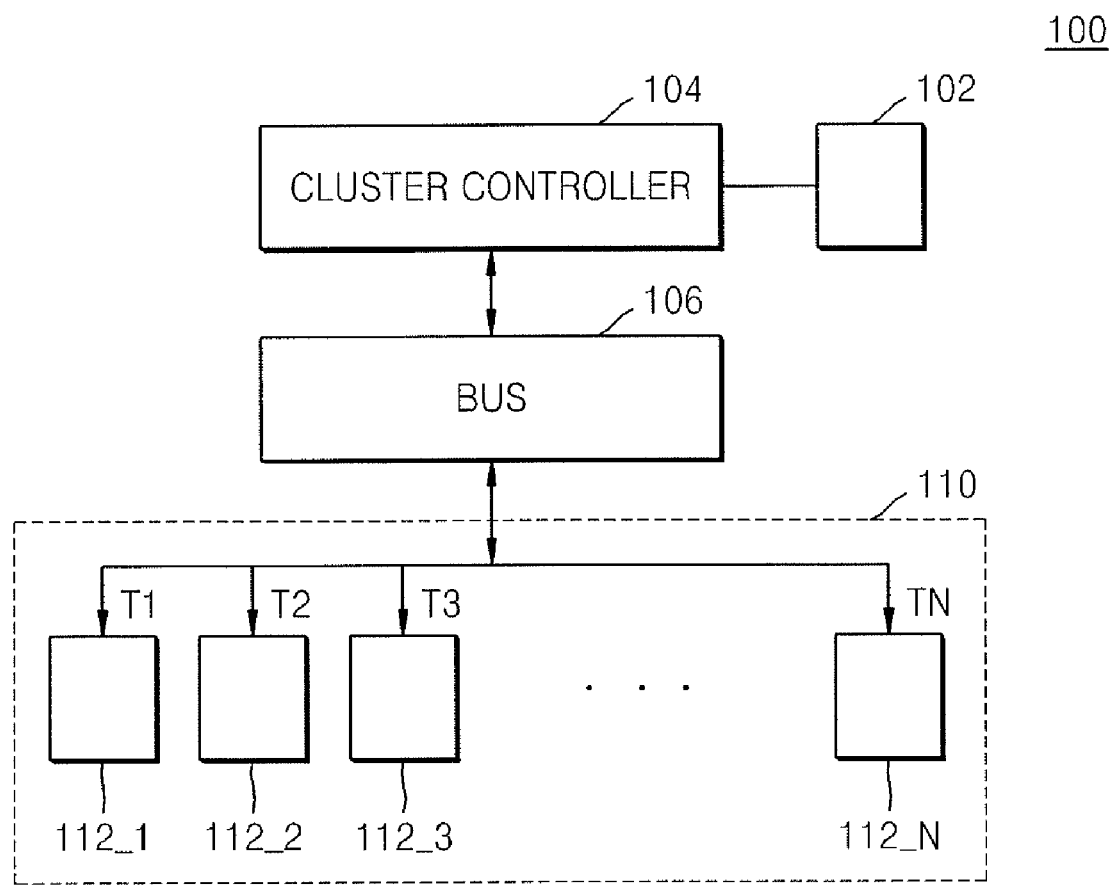
FIG. 1C illustrates a block diagram of a configuration of an OPC tool.

FIG. 1B illustrates a flowchart of details of a process for selectively performing an OPC operation corresponding to operation P40 of FIG. 1A. Referring to FIG. 1B, after the layout patterns in the templates T1, T2, T3, . . . , TN (which are divided from a layout of the full-chip layer) are divided into repetitive pattern parts RP and non-repetitive pattern parts NRP in operation P50 of FIG. 1A, an extracted portion equally repeated in a repetitive pattern part RP is selected from one of the templates T1, T2, T3, . . . , TN that includes the repetitive pattern part RP (operation P110 of FIG. 1B). Further details of the process will now be described in connection with FIGS. 3A through 3F, which illustrate diagrams of templates corresponding to design pattern layouts.

FIGS. 3A through 3F are diagrams of some templates of a plurality of templates that are obtained by performing a design hierarchy analysis by the method of manufacturing a semiconductor device according to embodiments. More particularly, FIGS. 3A-3F correspond to cases in which templates T1 (FIGS. 3A and 3B), T2 (FIGS. 3C and 3D), and T3 (FIGS. 3E and 3F) are configured from among a plurality of templates. The plurality of templates is obtained by performing an analysis of a design hierarchy on the first part 200A, the second part 200B, and the third part 200C of FIGS. 2A, 2B, and 2C, respectively, according to operation P30 of FIG. 1A.

The shapes and sizes of patterns and regions that are illustrated in FIGS. 3A and 3B, 3C and 3D, and 3E and 3F are examples, and the embodiments are not limited thereto.

Figure 3A:
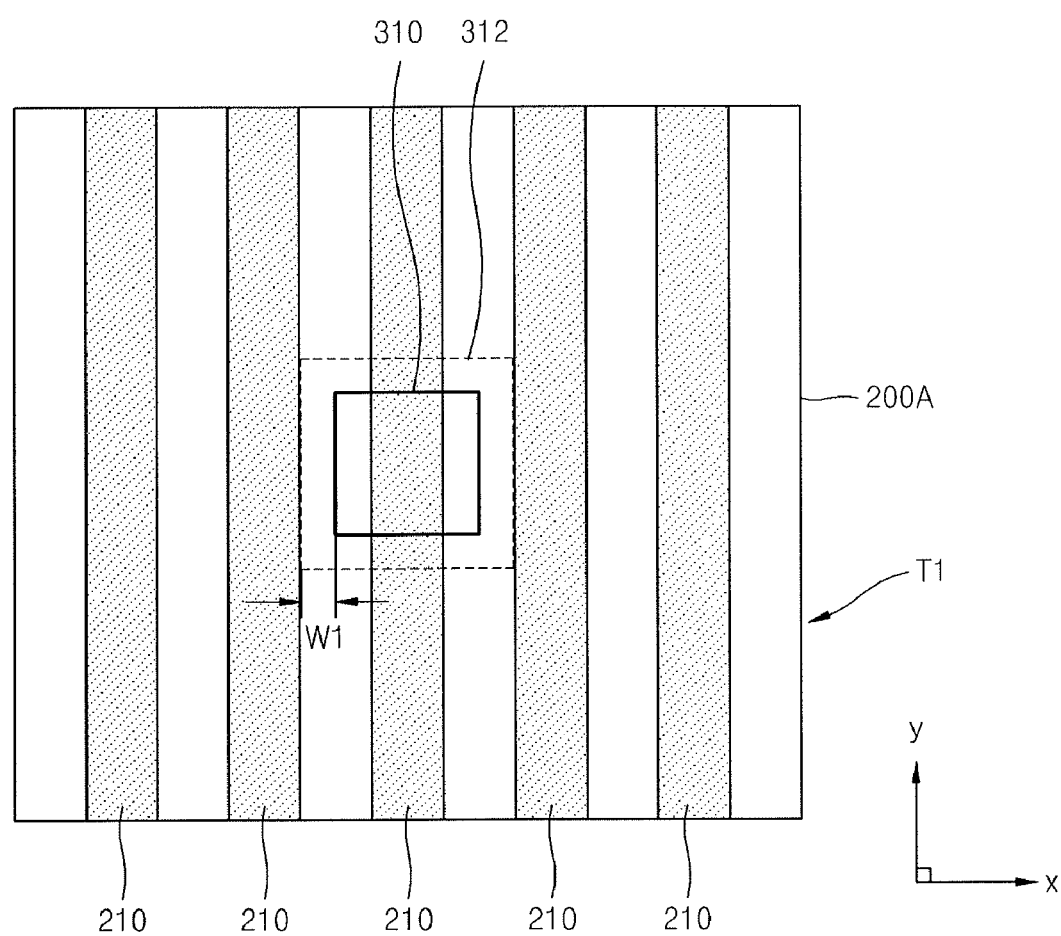
FIGS. 3A through 3F illustrate diagrams of templates corresponding to design pattern layouts.

Referring now to FIG. 3A, FIG. 3A corresponds to a case in which a shape of a polygon is used to determine a repetitive pattern part RP of a layout pattern in the template T1. In FIG. 3A, the layout pattern in the template T1 is formed of the repetitive pattern part RP. In particular, the layout pattern in the template T1 has a structure in which the line pattern 210 is repetitively disposed in the same manner in an extracted portion 310 that is a selected portion from the repetitive pattern part RP. In order to determine uniformity of patterns in the repetitive pattern part RP in operation P50 of FIG. 1A, not only the extracted portion 310, but also a shape of a pattern of an adjacent region 312 (surrounding the extracted portion 310 by having a predetermined width W1 therebetween) is compared. The width W1 may be set to be larger than an optical proximity effect. A size of the width W1 is not limited to a size shown in FIG. 3A.

Figure 3B:
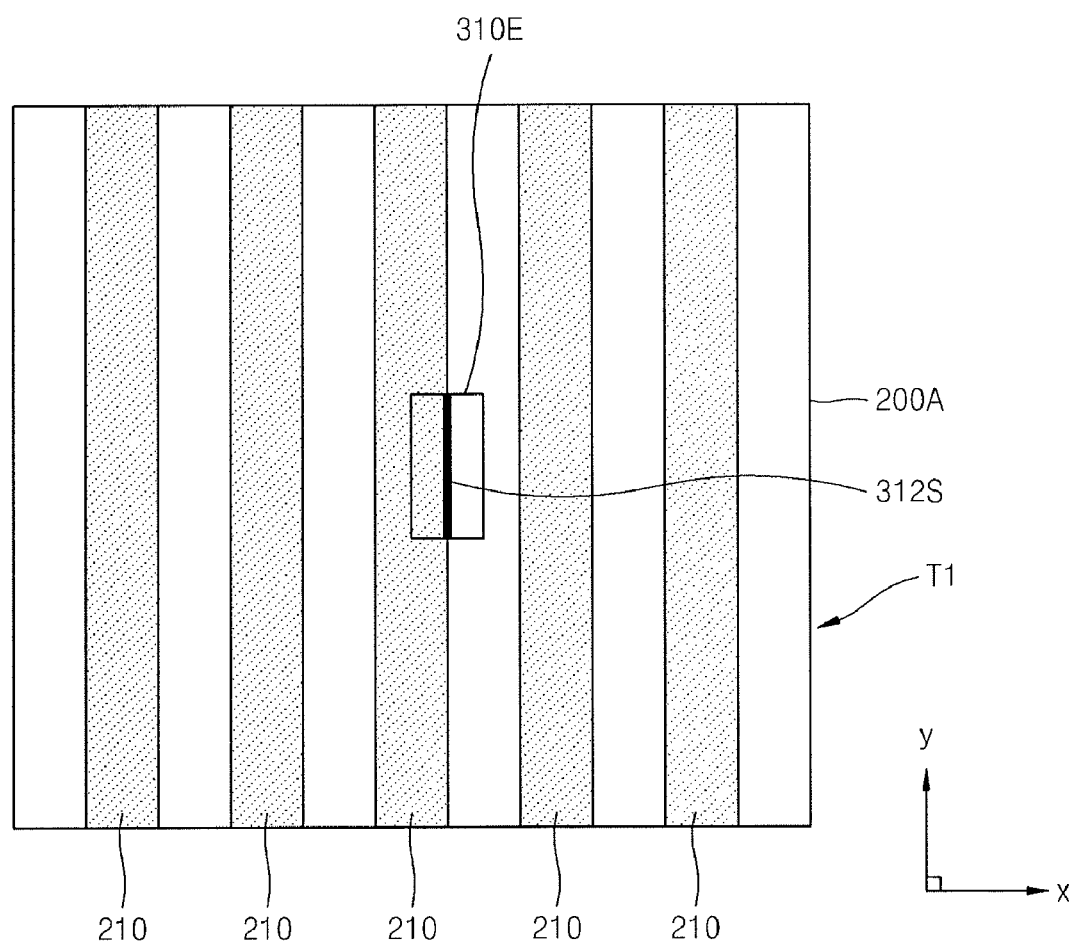

FIG. 3B corresponds to a case in which an edge of a pattern is used to determine the repetitive pattern part RP of the layout pattern in the template T1. Referring to FIG. 3B, a line 312S (forming a side edge of the line pattern 210 from among the repetitive pattern part RP included in the template T1) may be set as an extracted portion 310E in order to determine uniformity of patterns in the repetitive pattern part RP in operation P50 of FIG. 1A.

Figure 3C:
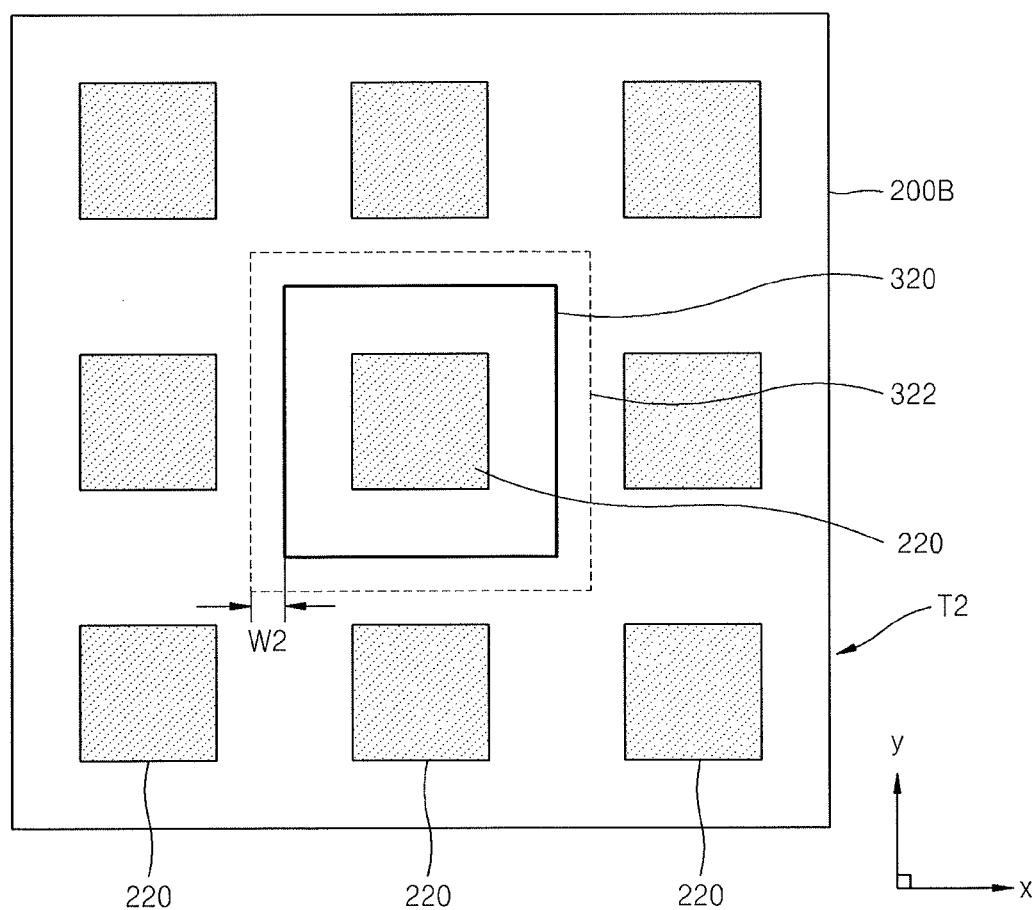

FIG. 3C corresponds to a case in which a shape of a polygon is used to determine a repetitive pattern part RP of a layout pattern in the template T2. In FIG. 3C, the layout pattern in the template T2 is formed of the repetitive pattern part RP. In particular, the layout pattern in the template T2 has a structure in which the island pattern 220 is repetitively disposed in the same manner in an extracted portion 320 that is a selected portion from the repetitive pattern part RP. In order to determine uniformity of patterns in the repetitive pattern part RP in operation P50 of FIG. 1A, not only the extracted portion 320 but also a shape of a pattern of an adjacent region 322 (surrounding the extracted portion 320 by having a predetermined width W2 therebetween) is compared. The width W2 may be set to be larger than an optical proximity effect. A size of the width W2 is not limited to a size shown in FIG. 3C.

Figure 3D:
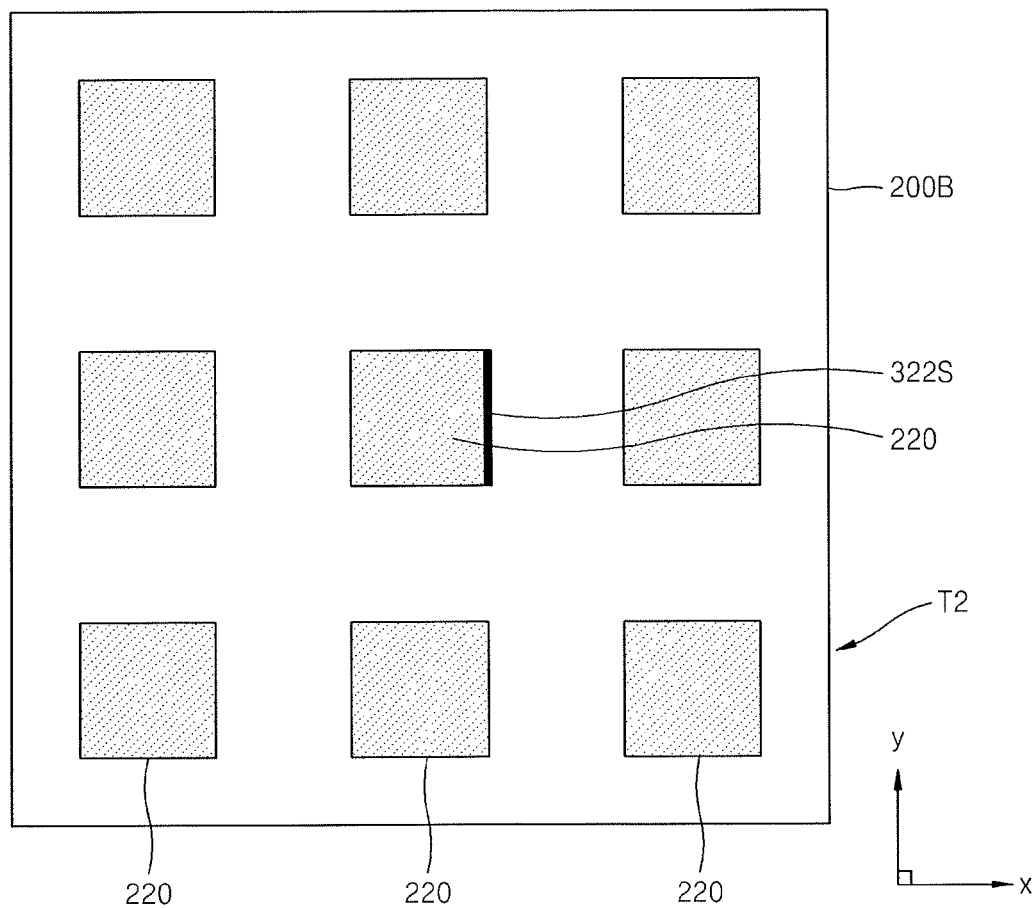

FIG. 3D corresponds to a case in which an edge of a pattern is used to determine the repetitive pattern part RP of the layout pattern in the template T2. In a case where the island pattern 220 included in the template T2 is square-shaped and exposing equipment including a lighting system is used (wherein four illuminations are disposed at a regular interval of 90 degrees with respect to a point on a planar surface in the lighting system), only a line 322S (selected from among four lines configuring an outline of the island pattern 220) may be set as an extracted portion 310E (refer to FIG. 3B) in order to determine uniformity of patterns in the repetitive pattern part RP in operation P50 of FIG. 1A.

Figure 3E:
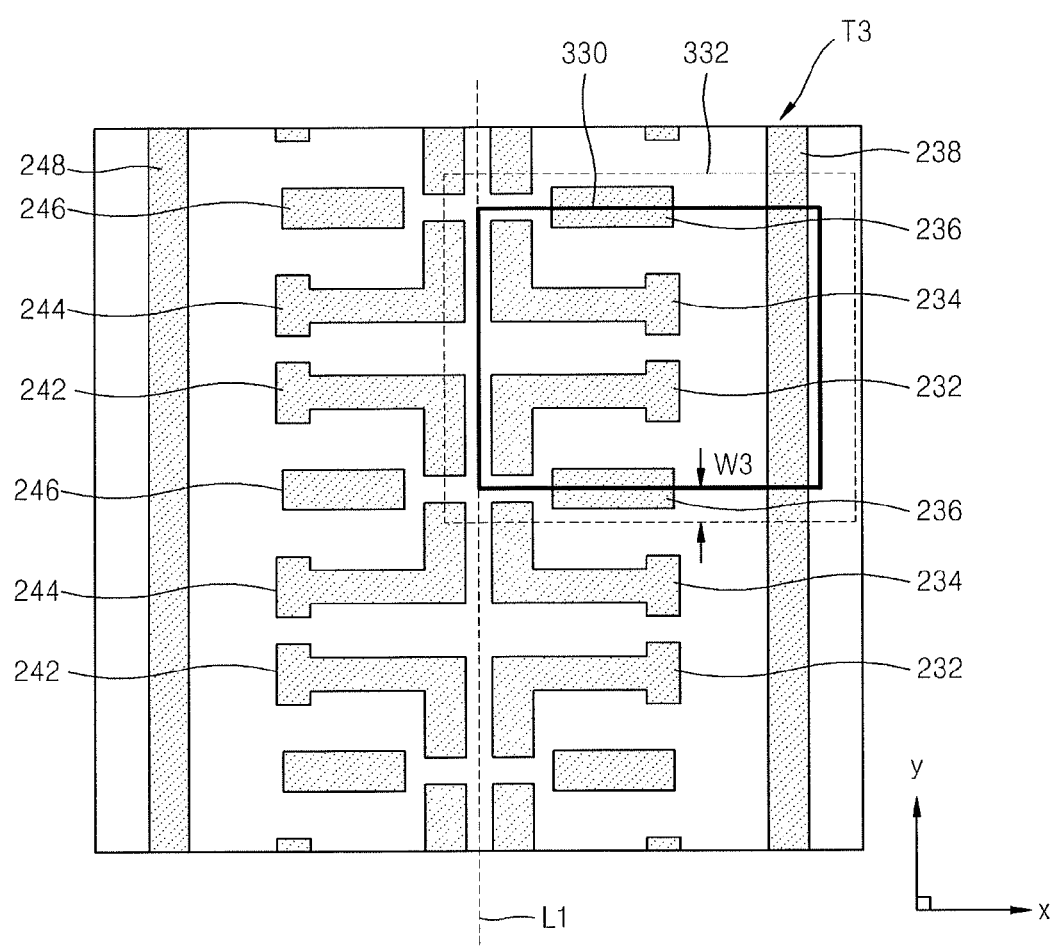

FIG. 3E corresponds to a case in which a shape of a polygon is used to determine a repetitive pattern part RP of a layout pattern in the template T3. In FIG. 3E, the layout pattern in the template T3 includes a plurality of types of repetitive pattern parts RP. For example, the layout pattern in the template T3 has a structure in which various shapes of patterns are repetitively disposed (see extracted portion 330). The extracted portion 330 is a selected portion from among the repetitive pattern parts RP. In order to determine uniformity of patterns in the repetitive pattern part RP in operation P50 of FIG. 1A, not only the extracted portion 330 but also a shape of a pattern of an adjacent region 332 that surrounds the extracted portion 330 by having a predetermined width W3 therebetween is compared. The width W3 may be set to be larger than an optical proximity effect, and a size of the width W3 is not limited to a size in FIG. 3E.

Figure 3F:
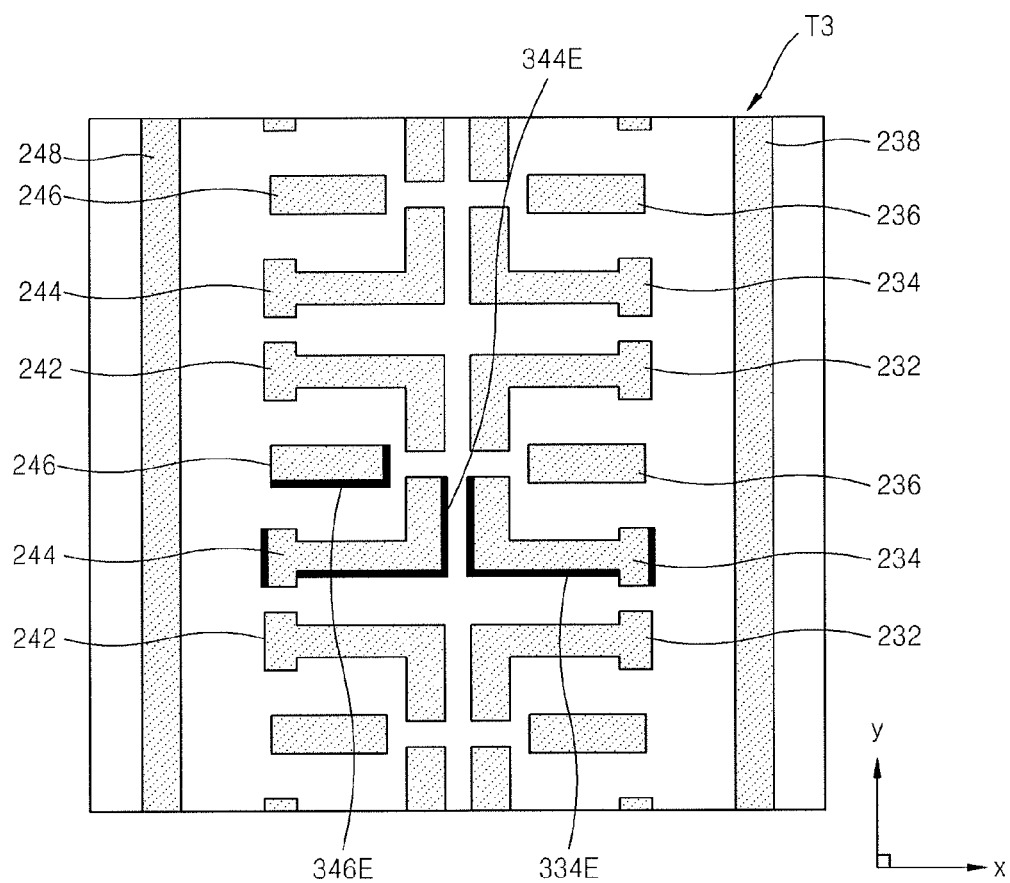

FIG. 3F corresponds to a case in which an edge of a pattern is used to determine the repetitive pattern parts RP of the layout pattern in the template T3. For example, in the second patterns 234 and the sixth patterns 244, a plurality of extracted lines including lines 334E, 344E, and 346E (which are selected from among all lines of edges configuring the second and sixth patterns 234 and 244) may be selected. Although not all extracted lines are illustrated in FIG. 3F, it is possible to select all of the necessary extracted lines with respect to all of the repetitive pattern parts RP.

With respect to FIGS. 3A, 3C, and 3E, the reason of comparing both of the shapes of patterns formed in the extracted portions 310, 320, and 330, and the shapes of the patterns formed in the adjacent regions 312, 322, and 332 surrounding the extracted portions 310, 320, and 330, respectively, is to determine whether an optical proximity effect on the adjacent regions 312, 322, and 332 is the same as an optical proximity effect on the patterns of the extracted portions 310, 320, and 330 in an exposing process.

In operation P120 of FIG. 1B, it is determined whether each of the templates T1, T2, T3, . . . , TN includes a repetitive pattern part RP. In operation P120 of FIG. 1B, if it is determined that a template (from among the templates T1, T2, T3, . . . , TN) does not include a repetitive pattern part RP, then the OPC operation is performed on all portions in the template so that a corrected layout is formed (operation P142 of FIG. 1B).

On the other hand, in operation P120 of FIG. 1B, if it is determined that a template (from among the templates T1, T2, T3, . . . , TN) does include a repetitive pattern part RP, then it is determined whether all portions in the template are the same repetitive pattern part RP as the extracted portion, or whether only some portions in the template are the same repetitive pattern part RP as one of the extracted portions (operation P130 of FIG. 1B).

In operation P130 of FIG. 1B, if it is determined that all portions in a corresponding template are the same repetitive pattern part RP as the extracted portions, then an OPC bias is obtained from only an extracted portion of the corresponding template (wherein the extracted portion is a partial portion selected from the repetitive pattern part RP) so that a corrected layout of the extracted portion is formed (operation P144 of FIG. 1B). A further detailed description with respect to forming the corrected layout of the extracted portion is provided in connection with operation P54 of FIG. 1A.

After the OPC bias with respect to the extracted portion is obtained in operation P144, the OPC bias obtained from the extracted portion is equally applied to other portions of the repetitive pattern part RP (wherein an OPC bias is not obtained from the other portions) so that a corrected layout having the same shape as the corrected layout of the extracted portion is formed (operation P146 of FIG. 1B).

In operation P130 of FIG. 1B, if it is determined that only some portions in the template are the same repetitive pattern part RP as the extracted portion, then operation P148 of FIG. 1B is performed. That is, for the repetitive pattern part RP in the template, an OPC bias is obtained only from an extracted portion, and the OPC bias of the extracted portion is equally applied to other portions of the repetitive pattern part RP (wherein the other portions are the same as the extracted portion), so that a corrected layout having the same shape as a corrected layout of the extracted portion is formed for the other portions via operations P144 and P146 of FIG. 1B. Then, operation P142 of FIG. 1B is performed on a non-repetitive pattern part NRP (that is, remaining portions of the template, except for the repetitive pattern part RP). That is, the OPC operation is performed on all of the remaining portions of the non-repetitive pattern in the template so that a corrected layout is formed via operation P58 of FIG. 1A.

Operations P142, P144, P146, and P148 of FIG. 1B may be simultaneously performed in a parallel manner.

Afterward, the corrected layouts (obtained from the templates T1, T2, T3, . . . , TN of the full-chip layer) are merged according to operation P60 of FIG. 1A, and a photomask (to be used in an exposing process for the manufacture of a semiconductor device) is formed based on data of the merged corrected layout, so that a photolithography process can be performed to form a desired semiconductor device (operation P70 of FIG. 1A).

Figure 4A:
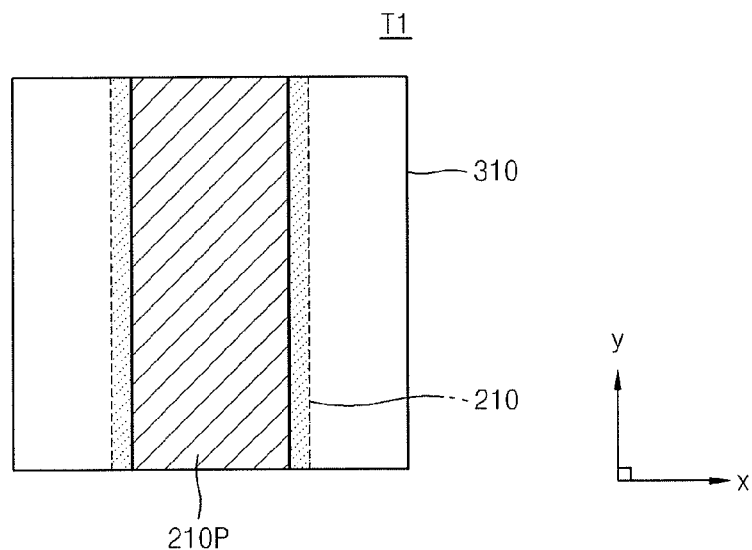
FIG. 4A illustrates a diagram of an OPC pattern.

FIG. 4A is a diagram of an OPC pattern obtained by applying perturbation on an extracted portion so as to form a corrected layout by obtaining an OPC bias only from the extracted portion in a repetitive pattern part of a template according to an embodiment. More particularly, FIG. 4A illustrates a diagram of an OPC pattern 210P in the extracted portion 310, in which a corrected layout is formed by obtaining an OPC bias only from the extracted portion 310 of the template T1 in FIG. 3A according to operation P144 of FIG. 1B. As illustrated in FIG. 4A, in order to obtain the OPC pattern 210P, an edge corresponding to one side of the line pattern 210 in the extracted portion 310 may be regarded as one repetition unit, and a bias with respect to the edge may be equally applied to all other edges. The OPC bias applied to the extracted portion 310 of the template T1, as illustrated in FIG. 4A, is equally applied to other repetitive pattern parts RP in the template T1 including the extracted portion 310.

Figure 4B:
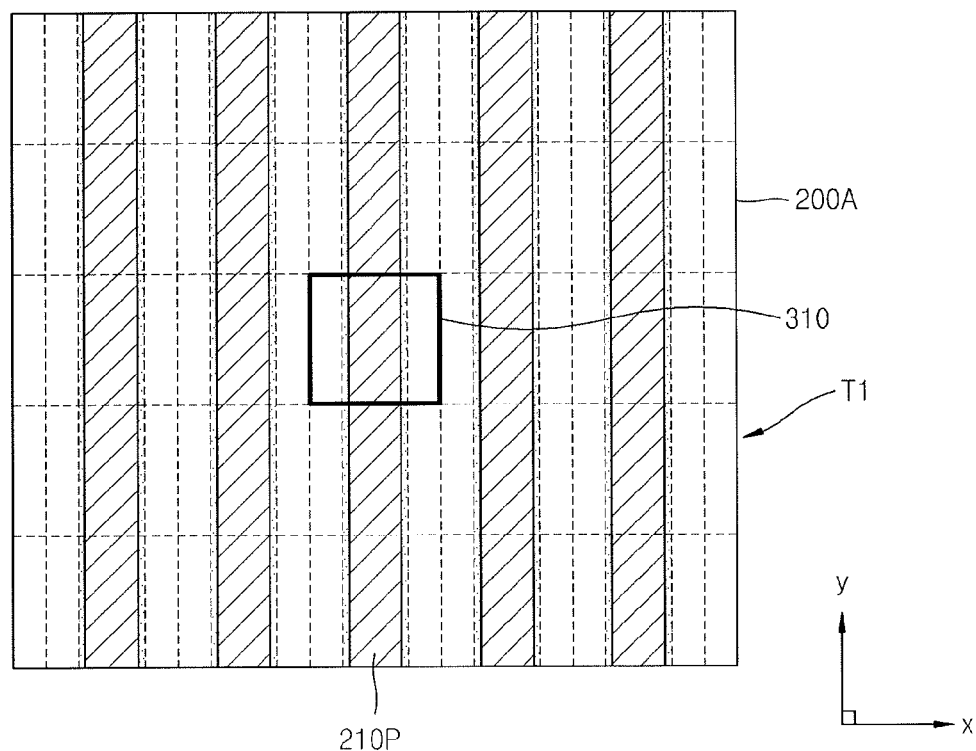
FIG. 4B illustrates a diagram of a corrected layout corresponding to FIG. 4A.

FIG. 4B is a diagram of a corrected layout in all repetitive pattern parts, wherein the corrected layout is corrected to have the same shape as the OPC pattern of the extracted portion of FIG. 4A. More particularly, FIG. 4B illustrates a diagram of a resultant obtained by equally applying the OPC bias to other repetitive pattern parts RP in the template T1, wherein the OPC bias is applied to the extracted portion 310, as illustrated in FIG. 4A.

Figure 5A:
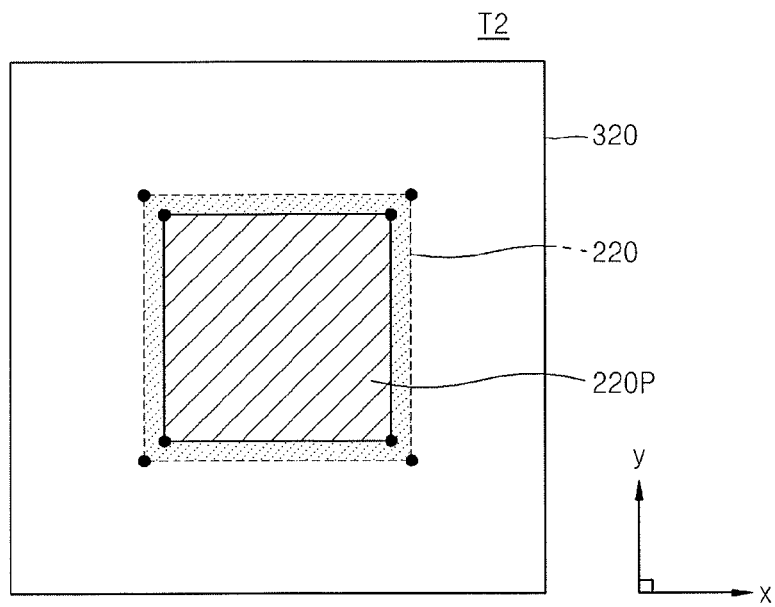
FIG. 5A illustrates a diagram of an OPC pattern.

FIG. 5A is a diagram of an OPC pattern obtained by applying perturbation on an extracted portion so as to form a corrected layout by obtaining an OPC bias only from the extracted portion in a repetitive pattern part of another template according to an embodiment. More particularly, FIG. 5A illustrates a diagram of an OPC pattern 220P in the extracted portion 320, in which a corrected layout is formed by obtaining an OPC bias only from the extracted portion 320 of the template T2 in FIG. 3B according to operation P144 of FIG. 1B. As illustrated in FIG. 5A, in order to obtain the OPC pattern 220P, an edge (denoted by using "•") corresponding to one side of the island pattern 220 in the extracted portion 320 may be regarded as one repetition unit, and a bias with respect to the edge may be equally applied to all other edges.

Figure 5B:
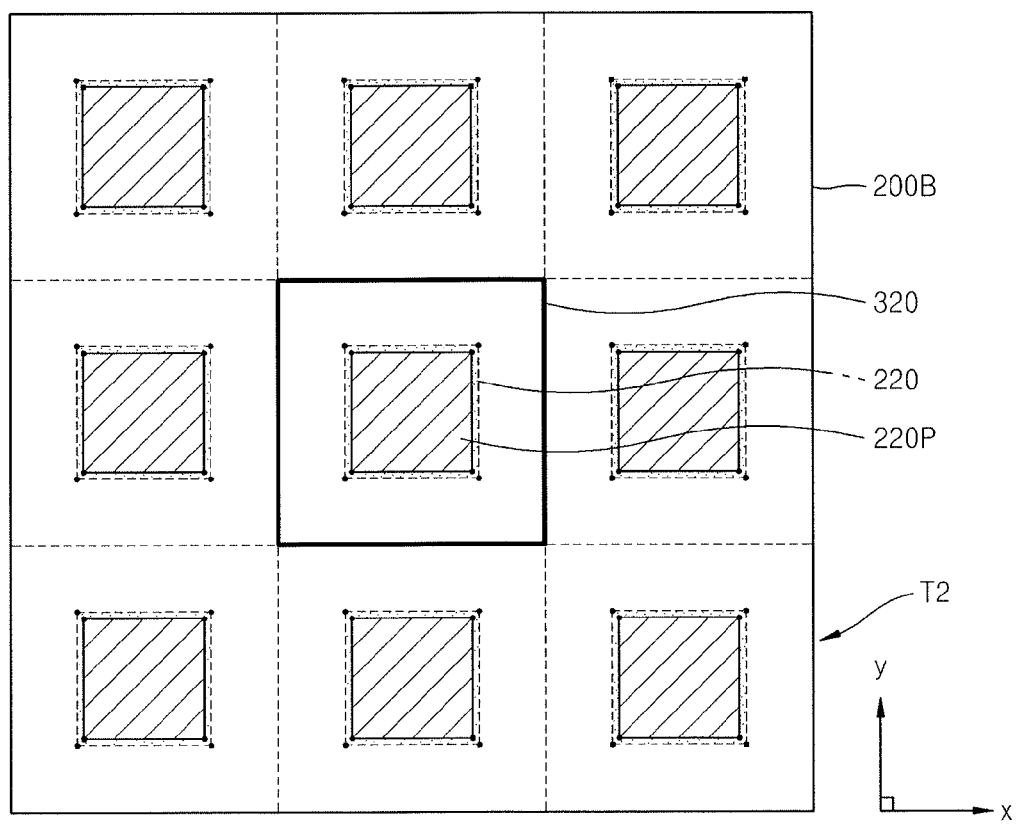
FIG. 5B illustrates a diagram of a corrected layout corresponding to FIG. 5A.

FIG. 5B is a diagram of a corrected layout in all repetitive pattern parts, wherein the corrected layout is corrected to have the same shape as the OPC pattern of the extracted portion of FIG. 5A. More particularly, FIG. 5B illustrates a diagram of a resultant obtained by equally applying the OPC bias to other repetitive pattern parts RP in the template T2, wherein the OPC bias is applied to the extracted portion 320, as illustrated in FIG. 5A.

Figure 6A:
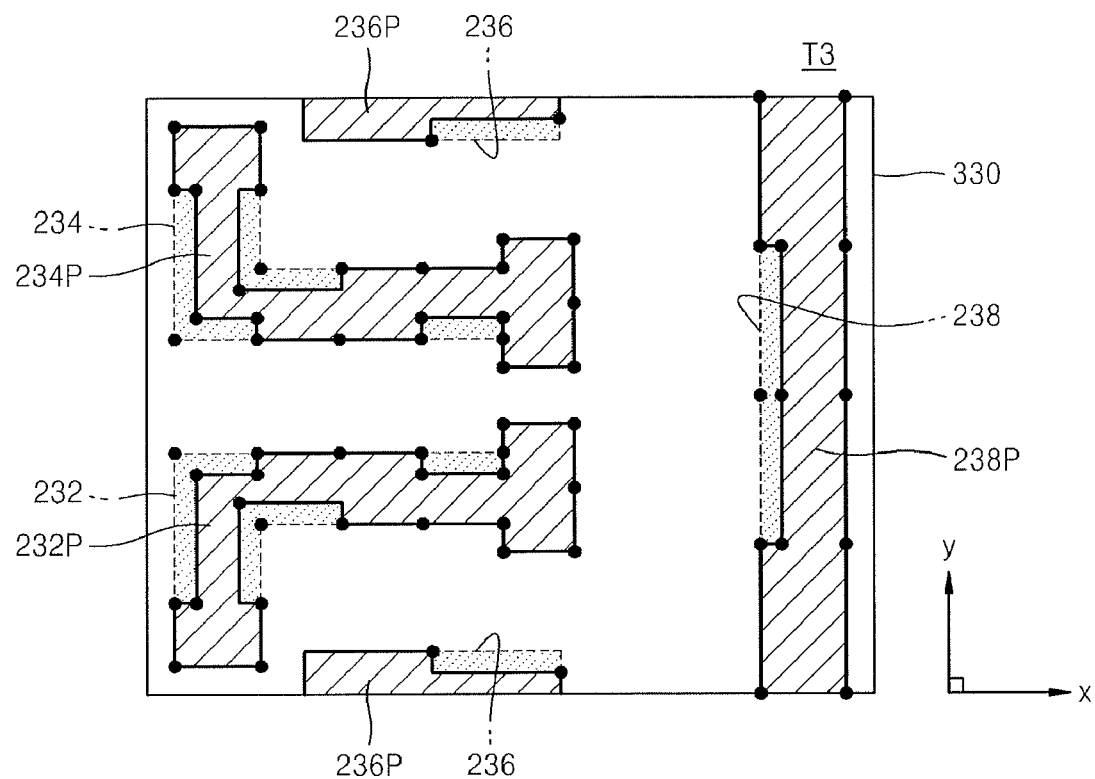
FIG. 6A illustrates a diagram of an OPC pattern.

FIG. 6A is a diagram of an OPC pattern obtained by applying perturbation on an extracted portion so as to form a corrected layout by obtaining an OPC bias only from the extracted portion in a repetitive pattern part of another template according to an embodiment. More particularly, FIG. 6A illustrates a diagram of OPC patterns 232P, 234P, 236P, and 238P in the extracted portion 330, in which a corrected layout is formed by obtaining an OPC bias only from the extracted portion 330 of repetitive pattern parts RP in the template T3 of FIG. 3E according to operation P144 of FIG. 1B.

FIG. 6A also illustrates a resultant obtained in a manner that edges of the first pattern 232, the second pattern 234, the third pattern 236, and the fourth pattern 238 in the extracted portion 330 are divided into a plurality of segments (denoted by using "•"), and an OPC bias obtained by performing a simulation process on each of the segments is applied to a layout in the extracted portion 330. Although not illustrated in FIG. 6A, in order to increase resolution in a photolithography process performed to form a desired pattern on a wafer, the OPC patterns 232P, 234P, 236P, and 238P may be formed as a resultant obtained in a manner that the OPC bias is applied to a layout in the extracted portion 330, and then auxiliary patterns such as a sub-resolution assist feature (SRAF) may be further added thereto.

Figure 6B:
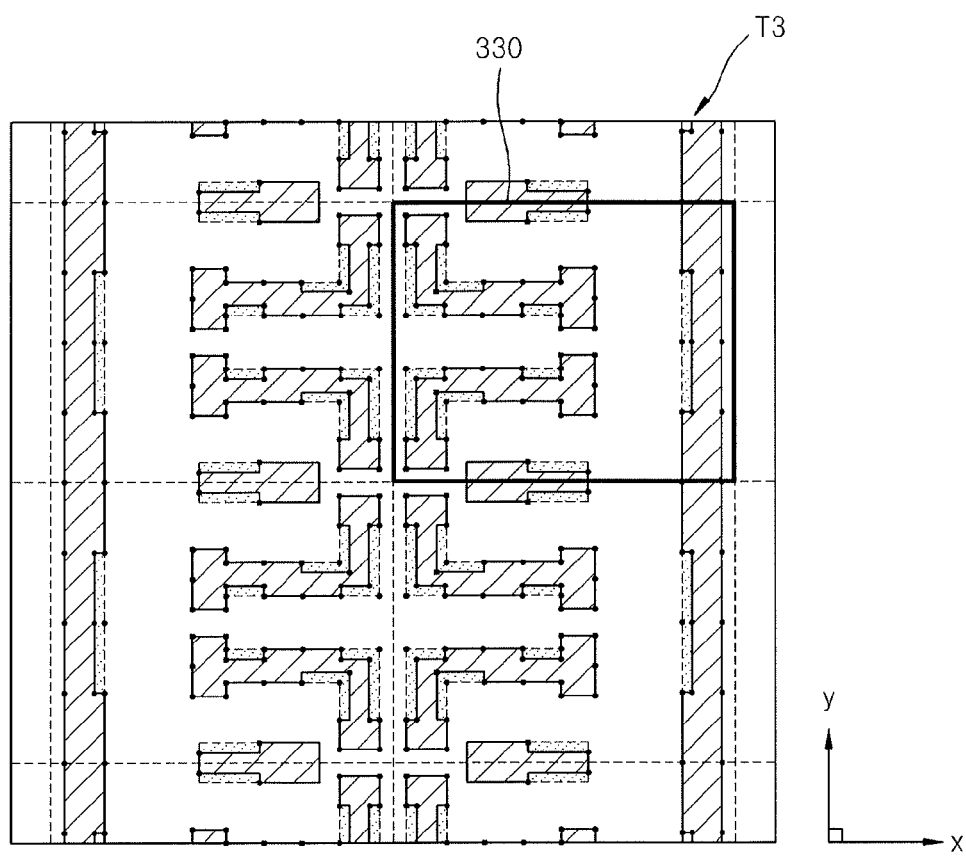
FIG. 6B illustrates a diagram of a corrected layout corresponding to FIG. 6B.

FIG. 6B is a diagram of a corrected layout that is corrected to have the same shape as the OPC pattern according to the OPC pattern of the extracted portion of FIG. 6A, or to be line-symmetrical to the OPC pattern. More particularly, FIG. 6B illustrates a diagram of a resultant obtained by equally applying the OPC bias to other repetitive pattern parts RP in the template T3, wherein the OPC bias is applied to the extracted portion 330, as illustrated in FIG. 6A. Here, pattern shape data with respect to the OPC patterns 232P, 234P, 236P, and 238P in the extracted portion 330 may be equally reflected on portions of other repetitive pattern parts RP (which have entirely the same layout as patterns in the extracted portion 330), so that the same OPC bias as the OPC patterns 232P, 234P, 236P, and 238P in the extracted portion 330 may be equally applied thereto. However, for the fifth pattern 242, the sixth pattern 244, the seventh pattern 246, and the eighth pattern 248 (which are line-symmetrical to the first pattern 232, the second pattern 234, the third pattern 236, and the fourth pattern 238), an OPC bias according to data that is line-symmetrically converted from the OPC bias with respect to the OPC patterns 232P, 234P, 236P, and 238P in the extracted portion 330 may be applied thereto.

As described above, in the repetitive pattern part of each of the templates T1, T2, T3, ..., TN, the OPC bias is obtained only from the extracted portions 310, 320, and 330. Thus, the corrected layout of the extracted portions 310, 320, and 330 is formed, as illustrated in FIGS. 4B, 5B, and 6B.

Also, in portions that are not extracted from the repetitive pattern part, a corrected layout is formed according to the OPC bias obtained from the extracted portions 310, 320, and 330. The corrected layout has a structure in which a pattern is uniformly and repetitively disposed, wherein the pattern has the same shape as the corrected layout of the extracted portions 310, 320, and 330, the pattern is point-symmetrical to the corrected layout of the extracted portions 310, 320, and 330, or the pattern is line-symmetrical to the corrected layout of the extracted portions 310, 320, and 330.

Also, with respect to portions that do not have the repetitive pattern part, an OPC bias is obtained from all of the portions, so that a corrected layout is formed according to the OPC bias.

As described above, corrected layouts of all templates, which are obtained by performing a selective OPC operation according to existence or non-existence of the repetitive pattern part, are merged according to operation P60 of FIG. 1A, then a photomask is formed by using the merged layout, and then a photolithography process is performed to form a desired semiconductor device.

According to the method of manufacturing a semiconductor device according to the present embodiment, in the repetitive pattern part (including patterns that have the same shapes or that are symmetrically repeated), the OPC bias is not obtained from all portions of the repetitive pattern part, but is instead obtained only from the extracted portion that is a partial portion selected from the repetitive pattern part. Then, the OPC bias from the extracted portion is equally applied to all of the portions of the repetitive pattern part. Thus, it may be possible to improve efficiencies and reduce delays by omitting unnecessary repetitive calculations occurring when an OPC bias is obtained from each of the segments in each template having equally-shaped patterns or symmetrical-shaped patterns. It may also be possible to increase an OPC finalizing speed. It may also be possible to avoid a situation in which patterns having the same shape may be corrected into patterns having different shapes (e.g., due to a signal value of light intensity being calculated to different valid values in the OPC operation). It may also be possible to simplify a run-time and the design hierarchy with respect to the layout of the full-chip layer when the OPC operation is performed.

Figure 7A:
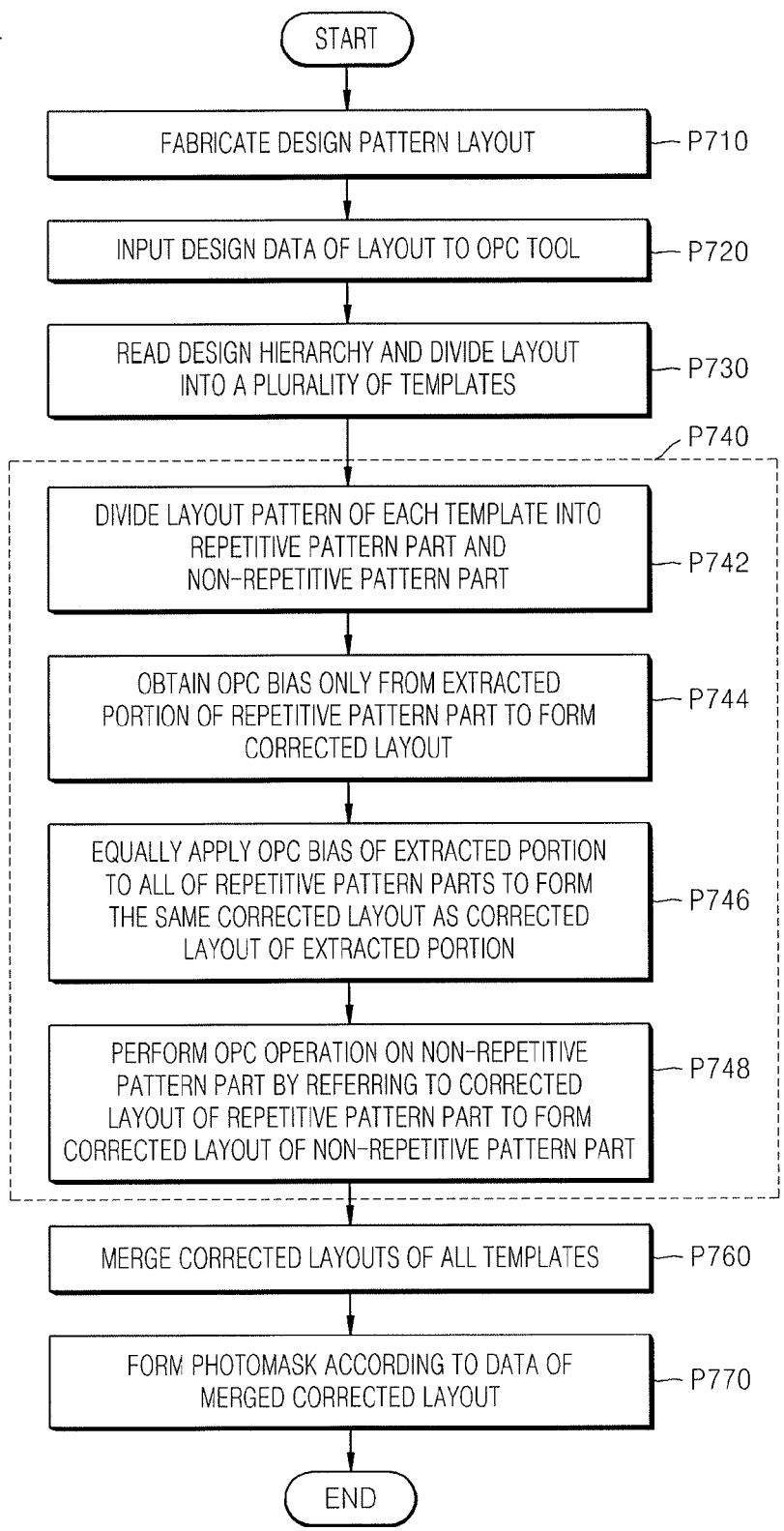
FIG. 7A illustrates a flowchart of a method of manufacturing a semiconductor device, according to another embodiment.

FIG. 7A illustrates a flowchart of a method of manufacturing a semiconductor device, according to another embodiment.

Referring to FIG. 7A, in the same manner as operation P10 of FIG. 1A, a design pattern layout (for a semiconductor device to be manufactured) is provided (operation P710). Design data of the design pattern layout fabricated in operation P710 is input to the OPC tool 100 (refer to FIG. 1C) in the same manner as operation P20 of FIG. 1A (operation P720). Afterward, in the same manner as operation P30 of FIG. 1A, the OPC tool 100 reads a design hierarchy from the design data of the design pattern layout, and divides a layout of a full-chip layer into a plurality of templates T1, T2, T3, ..., TN according to types of a unit device, and a proximity environment (operation P730).

Afterward, a subsequent procedure is performed according to a process for selectively performing an OPC operation on a layout pattern in each of the templates T1, T2, T3, ..., TN (operation P740 of FIG. 7A).

In the process for selectively performing the OPC operation (operation P740 of FIG. 7A) according to the present embodiment, all layout patterns in the templates T1, T2, T3, ..., TN are divided into a repetitive pattern part (in which the same shapes or symmetrical shapes are repetitively disposed) and a non-repetitive pattern part (that does not have a repetitive pattern) (operation P742 of FIG. 7A).

Afterward, in a case where the repetitive pattern part is included in a template having a layout pattern corresponding to an OPC operation target pattern, an OPC bias is obtained only from an extracted portion that is a partial portion selected from the repetitive pattern part, so that a corrected layout is formed (operation P744 of FIG. 7A). The extracted portion may be set as a minimum repetition unit selected from the repetitive pattern part, or may be set as a further extended range than the minimum repetition unit.

Figure 8A:
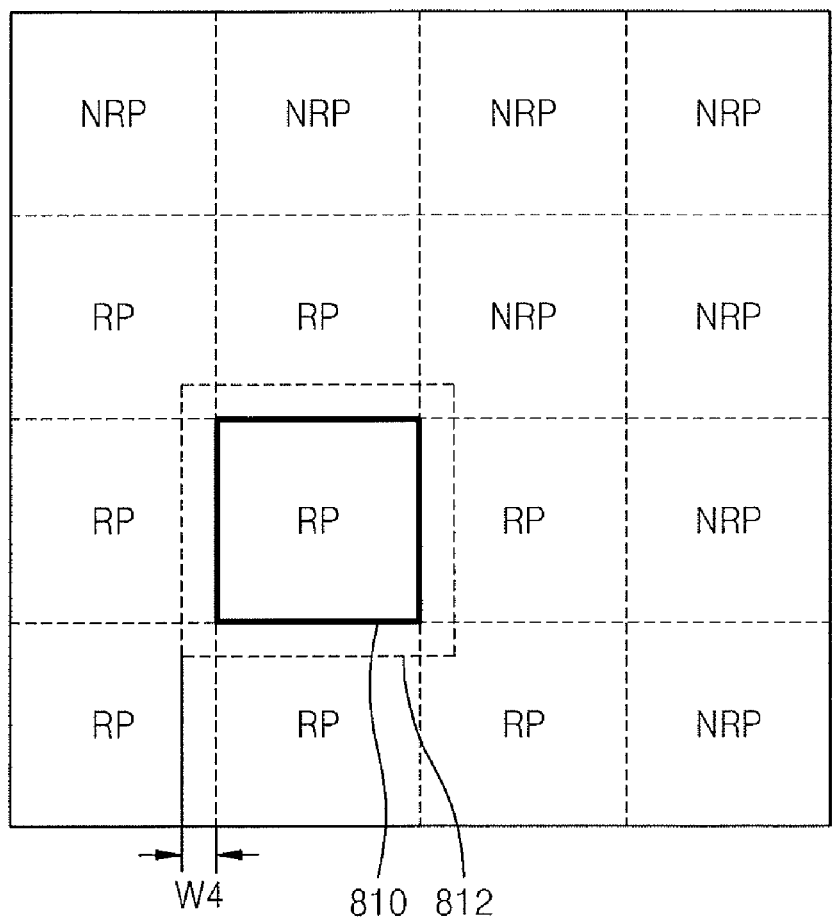
FIGS. 8A-8E illustrate diagrams of templates in an OPC operation.

FIG. 8A illustrates a diagram of a case in which a plurality of repetitive pattern parts RP and a plurality of non-repetitive pattern parts NRP are included in a template Ti (where, i is a natural number equal to or less than N) that is an OPC operation target. FIG. 8A illustrates an extracted portion 810 that is selected from the repetitive pattern parts RP included in the template Ti that is the OPC operation target. An adjacent region 812 (surrounding the extracted portion 810 and having a predetermined width W4 therebetween) may have an effect on a result of the OPC operation on the extracted portion 810. More particularly, when the OPC operation is performed on the extracted portion 810, a pattern shape and density in the adjacent region 812 may have an effect on a corrected layout obtained by performing the OPC operation on the extracted portion 810. The width W4 of the adjacent region 812 may be set to be larger than an optical proximity effect.

Figure 8B:
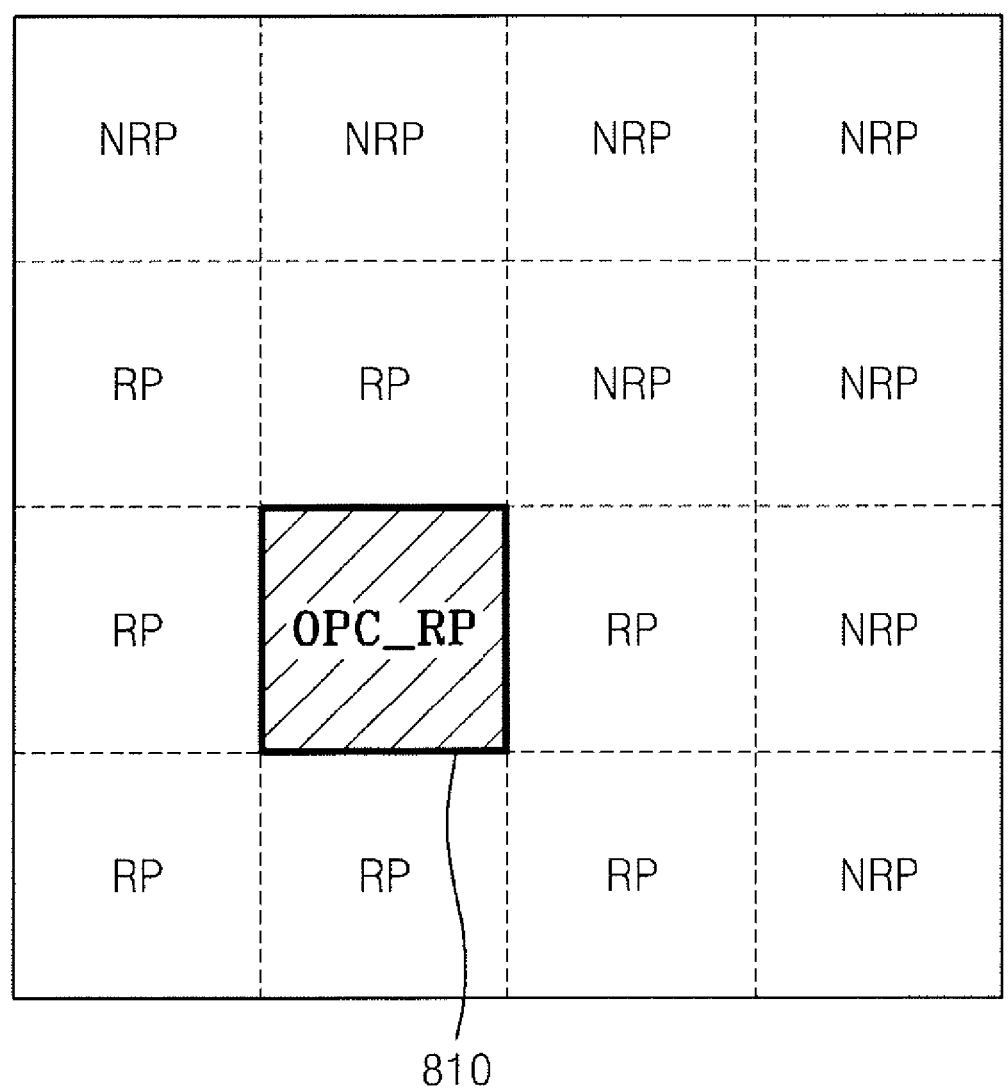

FIG. 8B is a diagram of a resultant achieved by obtaining an OPC bias only from an extracted portion selected from the plurality of repetitive patterns, and then forming a corrected layout of the extracted portion by the method of manufacturing a semiconductor device according to an embodiment. More particularly, FIG. 8B illustrates a diagram of a resultant achieved by obtaining an OPC bias only from the extracted portion 810 selected from the repetitive pattern parts RP according to operation P744 of FIG. 7A. In FIG. 8B, the extracted portion 810 having a corrected layout OPC_RP is hatched, wherein the OPC bias is obtained from the repetitive pattern parts RP and then is applied to the extracted portion 810. With respect to other portions of the repetitive pattern parts RP in the template Ti (i.e., except for the extracted portion 810), an OPC bias is not obtained from the other portions; instead, the OPC bias that is applied to the extracted portion 810 is equally applied to the other portions so that the corrected layout OPC_RP of the extracted portion 810 is also applied to the other portions.

Figure 8C:
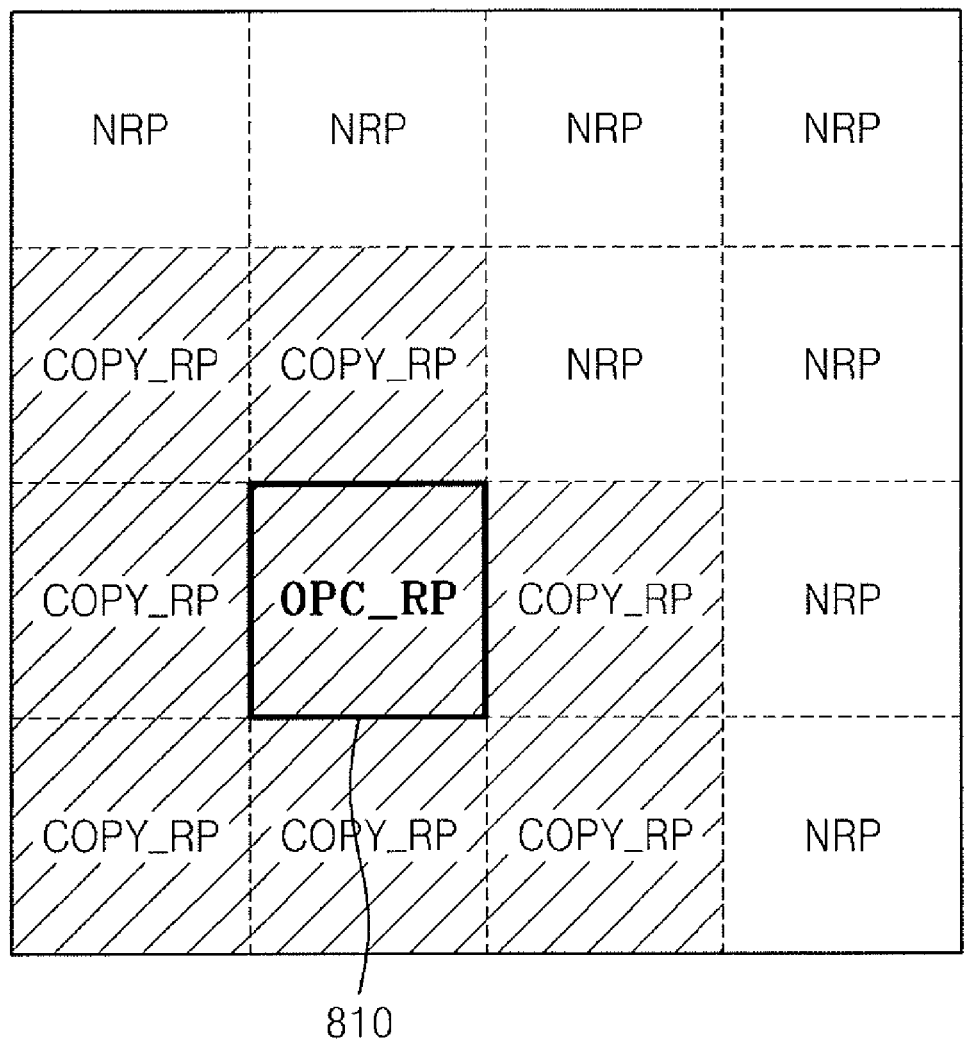

FIG. 8C is a diagram of a resultant obtained in a manner that the same corrected layout as the corrected layout, which is obtained from the extracted portion, is equally applied to other repetitive pattern part of a plurality of repetitive pattern parts in a template by the method of manufacturing a semiconductor device according to an embodiment, wherein an OPC operation is not performed on the other repetitive pattern part. More particularly, FIG. 8C illustrates a diagram of a resultant obtained in a manner that the OPC bias is not obtained from the other portions of the repetitive pattern parts RP in the template Ti; instead, the OPC bias that is applied to the extracted portion 810 is equally applied to the other portions so that the other portions have a corrected layout COPY_RP that is equal to the corrected layout OPC_RP of the extracted portion 810.

After the same corrected layout as that of the extracted portion 810 is formed in all of the repetitive pattern parts RP in the template Ti that is the OPC operation target, an OPC operation is performed on the non-repetitive pattern parts NRP by referring to the corrected layout of one of the repetitive pattern parts RP in the template Ti, so that a corrected layout of the non-repetitive pattern parts NRP is formed (operation P748 of FIG. 7A).

In the flowchart of FIG. 7A, operation P748 is shown as a process subsequent to operations P744 and P746, but an order of operations is not limited thereto. That is, the order of a process of forming a corrected layout in a repetitive pattern part and a process of forming a corrected layout in a non-repetitive pattern part may be changed. For example, as described with reference to FIG. 7A, in a case where the process of forming the corrected layout in the repetitive pattern part (operations P744 and P746) is first performed and then the process of forming the corrected layout in the non-repetitive pattern part is performed, the corrected layout in the repetitive pattern part may be referred to in the OPC operation for forming the corrected layout in the non-repetitive pattern part. In addition, although not illustrated, in a case where the process of forming the corrected layout in the non-repetitive pattern part is first performed, the corrected layout in the non-repetitive pattern part may be referred to in a process for obtaining an OPC bias from an extracted portion, so as to form the corrected layout in the repetitive pattern part.

Figure 8D:
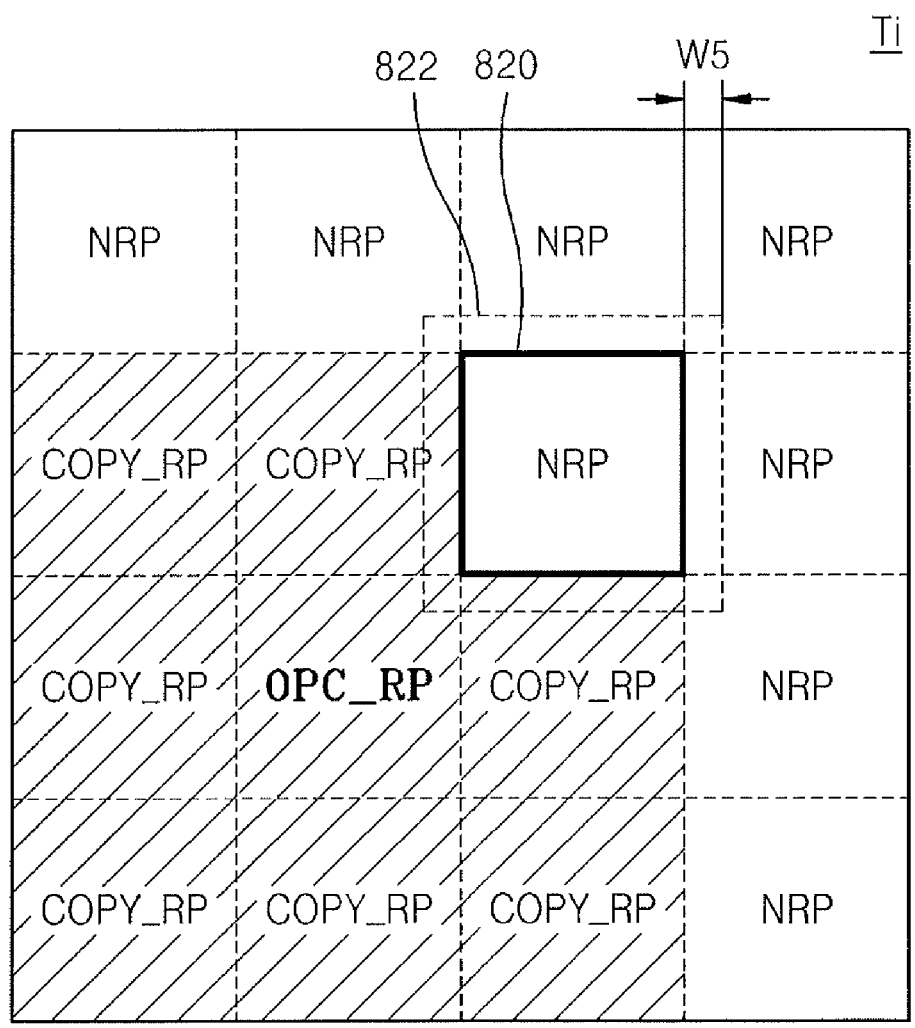

FIG. 8D is a diagram for describing a process in which an OPC operation is performed on a non-repetitive pattern part that is an OPC operation target from among the plurality of non-repetitive pattern parts, after corrected layouts are formed in all of the plurality of repetitive patterns in a template according to the OPC bias obtained from the extracted portion by the method of manufacturing a semiconductor device according to an embodiment. More particularly, FIG. 8D illustrates a diagram for describing a process in which an OPC operation is performed on a non-repetitive pattern part NRP 820 that is an OPC operation target from among the non-repetitive pattern parts NRP, after the corrected layouts OPC_RP and COPY_RP are formed in all of the repetitive pattern parts RP in the template Ti according to the OPC bias obtained from the extracted portion 810. In FIG. 8D, an adjacent region 822 (that surrounds the non-repetitive pattern part NRP 820 with a predetermined width W5 therebetween) may have an effect on a result of the OPC operation on the non-repetitive pattern part NRP 820 that is the OPC operation target. For example, when the OPC operation is performed on the non-repetitive pattern part NRP 820, a pattern shape and density in the adjacent region 822 may have an effect on a corrected layout obtained by performing the OPC operation on the non-repetitive pattern part NRP 820. The adjacent region 822 of the non-repetitive pattern part NRP 820 includes a portion of the repetitive pattern parts RP in which the corrected layouts OPC_RP and COPY_RP are formed. Thus, the OPC operation is performed on the non-repetitive pattern part NRP 820 by referring to the corrected layouts OPC_RP and COPY_RP of the repetitive pattern parts RP. The width W5 of the adjacent region 822 may be set to be larger than an optical proximity effect.

Figure 8E:
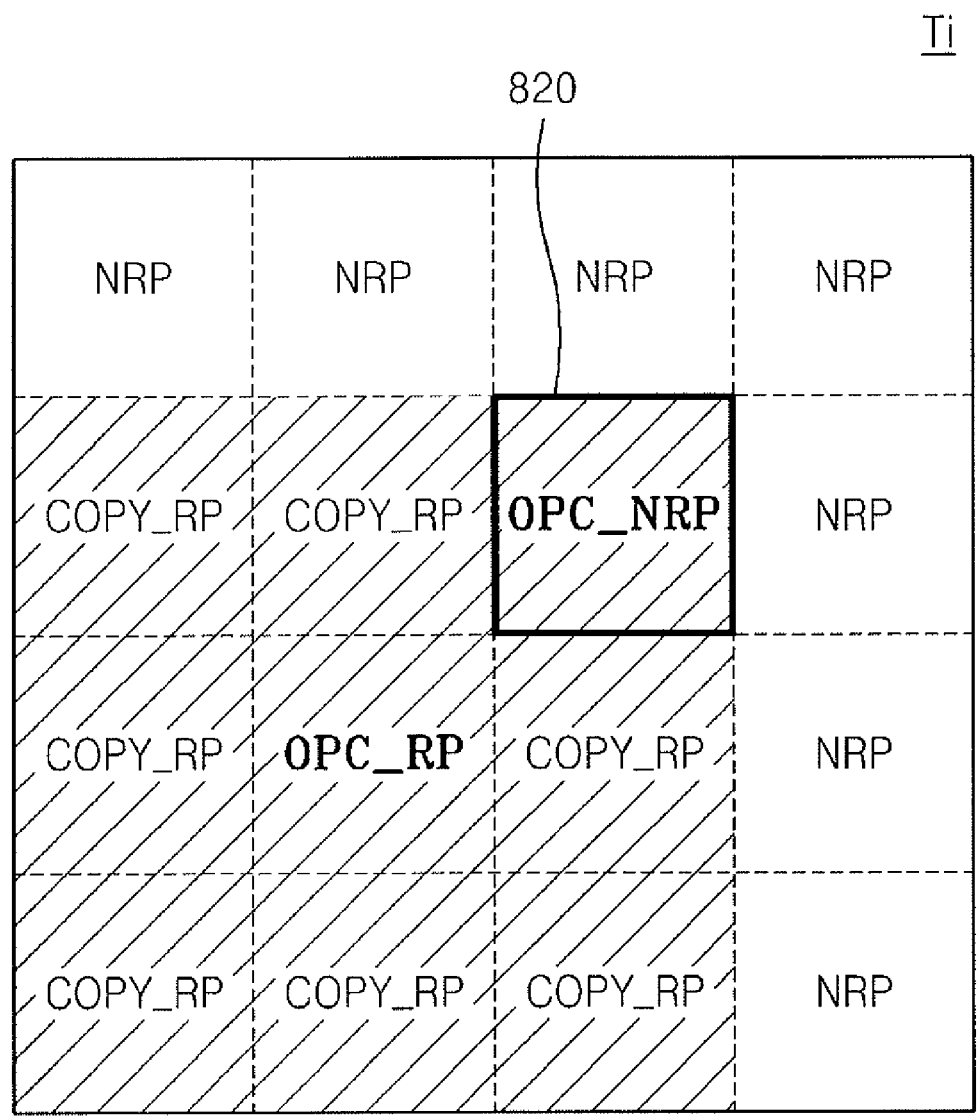

FIG. 8E is a diagram of a resultant obtained in a manner that a corrected layout is formed by performing an OPC operation on a non-repetitive pattern part by referring to the corrected layouts formed in the plurality of repetitive patterns by the method of manufacturing a semiconductor device according to an embodiment. More particularly, FIG. 8E illustrates a diagram of a resultant obtained in a manner that the corrected layout is formed by performing the OPC operation on the non-repetitive pattern part NRP 820 by referring to the corrected layouts OPC_RP and COPY_RP of the repetitive pattern parts RP. In FIG. 8E, the non-repetitive pattern part NRP 820 is hatched, wherein a corrected layout OPC_NRP that is obtained by performing the OPC operation is formed in the non-repetitive pattern part NRP 820.

With respect to the rest of the non-repetitive pattern parts NRP in the template Ti, an OPC operation is performed on each of the rest of the non-repetitive pattern parts NRP by referring to the corrected layouts OPC_NRP and COPY_RP that are formed in the non-repetitive pattern part NRP and the repetitive pattern RP around each of the rest of the non-repetitive pattern parts NRP, so that a corrected layout is formed.

After corrected layouts are formed for all of the templates T1, T2, T3, . . . , TN according to the process for selectively performing the OPC operation (operation P740 of FIG. 7A), as described with reference to operation P60 of FIG. 1A, the corrected layouts obtained from the templates T1, T2, T3, . . . , TN of the full-chip layer are merged. Thus, a merged corrected layout is formed (operation P760 of FIG. 7A).

Afterward, a photomask (to be used in an exposing process for the manufacture of a semiconductor device) is formed based on data of the merged corrected layout, so that a photolithography process can be performed to form a desired semiconductor device (operation P770 of FIG. 7A).

Figure 7B:
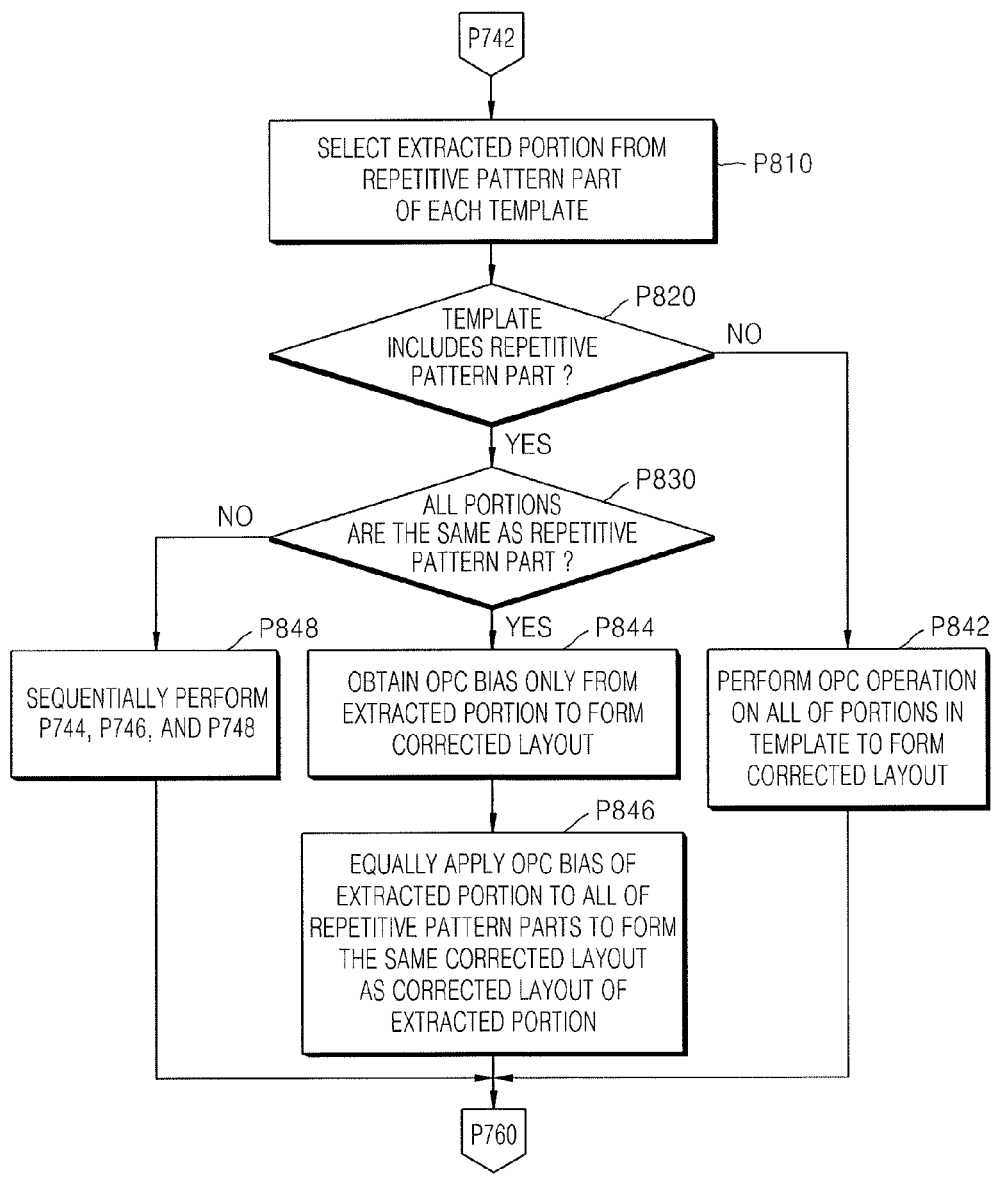
FIG. 7B illustrates a flowchart of details of a process for selectively performing an OPC operation according to an embodiment.

FIG. 7B illustrates a flowchart of details of a process for selectively performing the OPC operation corresponding to operation P740 of FIG. 7A. Referring to FIG. 7B, after the layout patterns in the templates T1, T2, T3, . . . , TN (which are divided from a layout of the full-chip layer) are divided into repetitive pattern parts RP and non-repetitive pattern parts NRP in operation P742 of FIG. 7A, an extracted portion equally repeated in a repetitive pattern part RP is selected from the template, which includes the repetitive pattern part RP (operation P810 of FIG. 7B).

In operation P820 of FIG. 7B, it is determined whether each of the templates T1, T2, T3, . . . , TN includes a repetitive pattern part. If it is determined that a template from among the templates T1, T2, T3, . . . , TN does not include a repetitive pattern part RP in operation P820 of FIG. 7B, then the OPC operation is performed on all portions in the template so that a corrected layout is formed (operation P842 of FIG. 7B). On the other hand, in operation P820 of FIG. 7B, if it is determined that a template from among the templates T1, T2, T3, . . . , TN does include a repetitive pattern part, then it is determined whether all portions of the template are repetitive pattern parts RP that are equal to the extracted portion, or whether some of the template are repetitive pattern parts RP that are equal to the extracted portion (operation P830 of FIG. 7B).

In operation P830 of FIG. 7B, if it is determined that all portions of the template are repetitive pattern parts RP that are equal to the extracted portion, then an OPC bias is obtained only from the extracted portion in the template so that a corrected layout is formed. Then, the OPC bias from the extracted portion is equally applied to all of the repetitive pattern parts RP that are equal to the extracted portion, so that a corrected layout of the repetitive pattern parts RP is formed (operation P844 of FIG. 7B). On the other hand, if it is determined in operation P830 that only some portions of the template are repetitive pattern parts RP that are equal to the extracted portion, then operations P744, P746, and P748 of FIG. 7A are sequentially performed on the repetitive pattern parts RP in the template, so that corrected layouts of all of the repetitive pattern parts RP and non-repetitive pattern parts NRP in the template are formed.

Afterward, the corrected layouts with respect to the templates T1, T2, T3, . . . , TN of the full-chip layer are merged according to operation P760 of FIG. 7A. Data of the merged corrected layout is output so as to form a photomask (to be used in an exposing process for the manufacture of a semiconductor device) based on the data of the merged corrected layout (operation P770 of FIG. 7A).

Detailed processes for performing the OPC operation in each of operations P842, P844, and P848 of FIG. 7B are described in relation to operations P54 and P58 of FIG. 1A, operations P142, P144, and P148 of FIG. 1B, and operations P744 and P748 of FIG. 7A.

As described above, in the repetitive pattern part of each of the templates T1, T2, T3, . . . , TN, the OPC bias is obtained only from the extracted portion that is selected from the repetitive pattern part. The OPC bias is equally applied to all repetitive pattern parts RP that are the same as the extracted portion. By doing so, according to the OPC bias obtained from the extracted portion, it is possible to generate a corrected layout having a structure in which all portions of the repetitive pattern part have the same shape, point-symmetry, or line-symmetry, and are uniformly disposed. Also, the OPC operation is performed on a non-repetitive pattern part (that does not have a repetitive part) by referring to the corrected layout of the repetitive pattern part, which is around the non-repetitive pattern part that is an OPC operation target.

The corrected layouts with respect to all of the templates are merged, wherein the corrected layouts are obtained by selectively performing the OPC operation. Then, the photomask is formed by using the merged corrected layout. Then, the photolithography process is performed to form a desired semiconductor device.

In the method of manufacturing a semiconductor device according to the present embodiment, in the repetitive pattern part (that includes patterns that have the same shapes or that are symmetrically repeated), the OPC bias is not obtained from all portions of the repetitive pattern part, but is instead obtained only from the extracted portion that is a partial portion selected from the repetitive pattern part. Then, the OPC bias from the extracted portion is equally applied to all of the portions of the repetitive pattern part, which are the same as the extracted portion. Also, the OPC operation is performed on the non-repetitive pattern part by referring to the corrected layout that is already formed in the repetitive pattern part, so that it is possible to correctly and efficiently perform the OPC operation.

As described above, embodiments relate to a method of manufacturing a semiconductor device, e.g., an integrated circuit (IC). More particularly, embodiment relate to a method of manufacturing a semiconductor device by performing optical proximity correction (OPC), for correcting an optical proximity effect, in connection with designing a layout for the manufacture of the semiconductor device.

Embodiments may provide a semiconductor device manufacturing method for implementing uniform shape patterns, whereby a time required to perform optical proximity correction (OPC) may be reduced. The OPC may be performed on a repetitive pattern part, or performed on symmetrically-shaped pattern parts, in an OPC operation of a full-chip layer layout. Thus, embodiments may provide a method for implementing a plurality of repetitively-disposed uniform shape patterns, or implementing a plurality of patterns having point symmetry or line symmetry, such as may be needed for a semiconductor device. Uniform correction may be performed on parts having the same shapes or symmetrical shapes, and repeated in the layout.

According to embodiments, in an OPC operation of a layout used to implement a plurality of patterns having the same shape, or to implement a plurality of patterns that are point-symmetrical or line-symmetrical, an OPC bias may be obtained only from an extracted portion. The extracted portion may be a partial portion of repetitive pattern parts configured by patterns that are uniformly or symmetrically repeated. Afterward, an OPC bias may not be obtained from other portions of the repetitive pattern parts (except for the extracted portion); instead, the OPC bias obtained from the extracted portion may be equally applied to the other portions of the repetitive pattern parts. The OPC operation may be performed to selectively obtain the OPC bias from the extracted portion. Thus, unlike non-repetitive parts, it may be possible to omit repetitive operations on the repetitive pattern parts configured by patterns that are uniformly or symmetrically repeated, and it may therefore be possible to reduce the time taken to perform the OPC operation.

Also, in a case where process for obtaining an OPC bias is performed a plurality of times so as to achieve a target shape according to a layout design, an OPC bias may be obtained again while the OPC bias that has been obtained from the extracted portion is equally applied to the other portions of the repetitive pattern parts except for the extracted portion, so that the time taken to obtain a corrected layout having the target shape with a final OPC bias may be significantly reduced relative to the time taken to perform a general OPC operation. By doing so, a run time and a turnaround time (TAT) for performing the OPC operation may be significantly reduced. Also, uniformly corrected patterns may be provided in portions of the layout in which patterns are uniformly or symmetrically repeated, so that patterns having the same shape may be readily implemented. Thus, it may be possible to efficiently manufacture a semiconductor device having improved pattern uniformity.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A method of manufacturing a semiconductor device on a substrate, the method comprising:
    dividing a design pattern layout into a repetitive pattern part and a non-repetitive pattern part;
    obtaining an optical proximity correction (OPC) bias from an extracted portion, the extracted portion being a partial portion of the repetitive pattern part;
    applying the OPC bias obtained from the extracted portion equally to the extracted portion and other portions of the repetitive pattern part so as to form a first corrected layout in which corrected layouts of the other portions are the same as that of the extracted portion; and
    forming a photomask in all portions of the repetitive pattern part according to the first corrected layout; and
    using the photomask in an exposing process to form a pattern on a surface of the substrate.

2. The method as claimed in claim 1, further comprising:
    performing an OPC operation on all portions of the non-repetitive pattern part in the design pattern layout to form a second corrected layout; and
    forming a merged corrected layout by merging the first and second corrected layouts,
    wherein the photomask is formed according to the merged corrected layout.

3. The method as claimed in claim 2, wherein forming the first corrected layout and forming the second corrected layout are performed in parallel.

4. The method as claimed in claim 2, wherein forming the second corrected layout is performed after forming the first corrected layout.

5. The method as claimed in claim 4, wherein forming the second corrected layout includes performing an OPC operation on the non-repetitive pattern part by referring to the first corrected layout of the repetitive pattern part.

6. The method as claimed in claim 1, further comprising dividing the design pattern layout into a plurality of templates by reading a design hierarchy of the design pattern layout,
    wherein dividing the design pattern layout into the repetitive pattern part and the non-repetitive pattern part includes dividing a design pattern layout that is included in each of the plurality of templates into the repetitive pattern part and the non-repetitive pattern part.

7. The method as claimed in claim 6, wherein forming the first corrected layout of the repetitive pattern part includes:
    obtaining an OPC bias from an extracted portion that is selected from a repetitive pattern part of each of the plurality of templates, and
    without obtaining an OPC bias of the portions of the repetitive pattern part other than the extracted portion, applying the OPC bias of the extracted portion to the portions of the repetitive pattern part of each of the plurality of templates.

8. The method as claimed in claim 7, further comprising:
    forming a second corrected layout by performing an OPC operation on all portions of a non-repetitive pattern in the design pattern layout included in each of the plurality of templates; and
    forming a merged corrected layout by merging the first corrected layout and the second corrected layout, with respect to the plurality of templates.

9. The method as claimed in claim 1, wherein obtaining the OPC bias from the extracted portion and forming the first corrected layout of the extracted portion includes:
    dividing an edge line of a design pattern layout of an OPC operation target into a plurality of segments; and
    forming a perturbation pattern by applying perturbation on first segments of the plurality of segments so as to move the first segments in a desired direction, the first segments being segments of the extracted portion,
    wherein, while the perturbation is applied to the first segments of the extracted portion, the same perturbation that is applied to the first segments is applied to second segments in other portions of the repetitive pattern part, the second segments having a shape that is the same as or symmetrical to that of the first segments.

10. The method as claimed in claim 1, wherein dividing the design pattern layout into the repetitive pattern part and the non-repetitive pattern part includes assigning, as the repetitive pattern part, a part in which patterns having the same shape are repetitively disposed, and a part in which patterns that are symmetrical to each other are repetitively disposed.

11. The method as claimed in claim 10, wherein data of a corrected layout is used in order to apply the first corrected layout to a first portion having the same design pattern layout as the extracted portion of the repetitive pattern part, the corrected layout having the same shape as the first corrected layout.

12. The method as claimed in claim 10, wherein data of a corrected layout is used in order to apply the first corrected layout to a second portion having a symmetrical design pattern layout to the extracted portion of the repetitive pattern part, the corrected layout being symmetrically converted from data regarding the first corrected layout.

13. The method as claimed in claim 12, wherein:
    when the second portion has a design pattern layout that has a point-symmetrical shape to the extracted portion, data of a corrected layout that is point-symmetrically converted from the data regarding the first corrected layout is used to apply the first corrected layout to the second portion, and
    when the second portion has a design pattern layout that has a line-symmetrical shape to the extracted portion, data of a corrected layout that is line-symmetrically converted from the data regarding the first corrected layout is used to apply the first corrected layout to the second portion.

14. A method of manufacturing a semiconductor device on a substrate, the method comprising:
    providing a design pattern layout;
    dividing the design pattern layout into a plurality of templates by using a design hierarchy of the design pattern layout;
    dividing a design pattern layout included in each of the plurality of templates into a repetitive pattern part and a non-repetitive pattern part;
    performing an optical proximity correction (OPC) operation on an extracted portion that is a partial portion of the repetitive pattern part in each of the plurality of templates to form a first corrected layout of the extracted portion;
    applying the first corrected layout of the extracted portion to other portions of the repetitive pattern part except for the extracted portion in each of the plurality of templates, without obtaining an OPC bias;
    performing an OPC operation on all portions of the non-repetitive pattern part in each of the plurality of templates to form a second corrected layout; and forming a merged corrected layout by merging the first corrected layout and the second corrected layout that are formed in the plurality of templates forming a photomask according to the merged corrected layout; and using the photomask in an exposing process to form a pattern on a surface of the substrate.

15. The method as claimed in claim 14, wherein forming the first corrected layout and forming the second corrected layout are performed in parallel in each of the plurality of templates.

16. The method as claimed in claim 14, wherein forming the second corrected layout is performed in each of the plurality of templates after sequentially forming the first corrected layout by obtaining the OPC bias from the extracted portion, and applying the first corrected layout to the other portions of the repetitive pattern part except for the extracted portion.

17. The method as claimed in claim 16, wherein, when the second corrected layout is formed in a template that is selected from the plurality of templates, an OPC operation is performed on a non-repetitive pattern part in the selected template by referring to the first corrected layout of a repetitive pattern part in the selected template.

18. The method as claimed in claim 14, wherein dividing the design pattern layout included in each of the plurality of templates into the repetitive pattern part and the non-repetitive pattern part includes:

determining the repetitive pattern part and the non-repetitive pattern part by determining pattern uniformity according to shapes of a plurality of polygons configuring a design pattern layout included in each of the plurality of templates.

19. The method as claimed in claim 14, wherein dividing the design pattern layout included in each of the plurality of templates into the repetitive pattern part and the non-repetitive pattern part includes:

determining the repetitive pattern part and the non-repetitive pattern part by determining pattern uniformity according to a feature of edges that configure an outline of a design pattern layout included in each of the plurality of templates.

20. A method of manufacturing a semiconductor device on a substrate, the method comprising:

dividing a design pattern layout into a repetitive pattern part and a non-repetitive pattern part, wherein the repetitive pattern part is determined according to shapes of polygons configuring the design pattern layout, or according to features of edges configuring an outline of the design pattern layout;

obtaining an optical proximity correction (OPC) bias from an extracted portion, the extracted portion being a partial portion of the repetitive pattern part;

applying the OPC bias obtained from the extracted portion to the extracted portion and other portions of the repetitive pattern part so as to form a first corrected layout in which corrected layouts of the other portions are the same as that of the extracted portion; and forming a photomask in all portions of the repetitive pattern part according to the first corrected layout; and using the photomask in an exposing process to form a pattern on a surface of the substrate.

* * * * *